(12) United States Patent
Hammer et al.

(10) Patent No.: US 10,158,946 B2
(45) Date of Patent: Dec. 18, 2018

(54) SPEAKER DISCOVERY AND ASSIGNMENT

(71) Applicant: PWV Inc, Bellevue, WA (US)

(72) Inventors: Jeremy Adam Hammer, Kirkland, WA (US); James Andrew Hammer, Kirkland, WA (US); Ryan Baker, Sammamish, WA (US); Michael Welter, Houston, TX (US); Austin Foxley, Seattle, WA (US)

(73) Assignee: PWV INC, Bellevue, WA (US)

( * ) Notice: Subject to any disclaimer, the term of this patent is extended or adjusted under 35 U.S.C. 154(b) by 0 days.

(21) Appl. No.: 14/846,727

(22) Filed: Sep. 4, 2015

(65) Prior Publication Data
US 2016/0073197 A1 Mar. 10, 2016

Related U.S. Application Data

(60) Provisional application No. 62/045,954, filed on Sep. 4, 2014, provisional application No. 62/099,957, filed on Jan. 5, 2015.

(51) Int. Cl.
*H04B 3/00* (2006.01)
*H04R 5/02* (2006.01)
*H04W 12/04* (2009.01)
*H04S 7/00* (2006.01)

(52) U.S. Cl.
CPC .............. *H04R 5/02* (2013.01); *H04W 12/04* (2013.01); *H04R 2205/024* (2013.01); *H04R 2420/07* (2013.01); *H04S 7/30* (2013.01)

(58) Field of Classification Search
CPC .......... H04R 2420/07; H04R 3/12; H04R 2205/024; H04R 5/02; H04W 12/04; H04W 84/18; H04W 48/18; H04S 7/30
USPC ...... 381/12, 14, 16, 17, 18, 19, 77, 80, 300, 381/310, 311, 334; 700/94; 455/3.06, 455/41.2, 456.1, 66.1; 340/539.13
See application file for complete search history.

(56) References Cited

U.S. PATENT DOCUMENTS

| | | |
|---|---|---|
| 7,983,615 B2 | 7/2011 | Bryce et al. |
| 8,423,893 B2 | 4/2013 | Ramsay et al. |
| 8,432,260 B2 | 4/2013 | Talty et al. |
| 2005/0031129 A1 | 2/2005 | Devantier et al. |

(Continued)

OTHER PUBLICATIONS

International Search Report and Written Opinion for International (PCT) Patent Application No. PCT/US2015/48730, dated Jan. 6, 2016 12 pages.

*Primary Examiner* — Vivian Chin
*Assistant Examiner* — Friedrich W Fahnert
(74) *Attorney, Agent, or Firm* — Merchant & Gould PC

(57) ABSTRACT

Described herein are systems, devices, and methods for discovering and assigning wireless speakers to one or more devices capable of providing audio content. In some embodiments, the speakers may receive one or more channels of multi-channel audio content. In some embodiments, one or more wireless speakers are discovered, a prompt identifying at least one speaker location is provided at an output device, a list of wireless speakers is provided to the output device, wherein the list of wireless speakers corresponds to the discovered one or more wireless speakers, a selection of a wireless speaker from the list of wireless speakers is received; and the selected wireless speaker is associated to the at least one speaker location.

20 Claims, 25 Drawing Sheets

(56) References Cited

U.S. PATENT DOCUMENTS

| | | | |
|---|---|---|---|
| 2008/0242222 A1* | 10/2008 | Bryce | H04L 12/2809 |
| | | | 455/3.06 |
| 2008/0253575 A1 | 10/2008 | Lorgeoux et al. | |
| 2009/0193472 A1 | 7/2009 | Braithwaite et al. | |
| 2009/0298420 A1* | 12/2009 | Haartsen | H04J 3/0658 |
| | | | 455/3.06 |
| 2010/0172512 A1 | 7/2010 | Braithwaite et al. | |
| 2010/0284389 A1* | 11/2010 | Ramsay | G06F 17/30017 |
| | | | 370/338 |
| 2010/0292818 A1* | 11/2010 | Ramsay | H04R 27/00 |
| | | | 700/94 |
| 2010/0293264 A1* | 11/2010 | Ramsay | H04L 12/2809 |
| | | | 709/223 |
| 2010/0299639 A1* | 11/2010 | Ramsay | G06F 3/0486 |
| | | | 715/835 |
| 2011/0044468 A1 | 2/2011 | Braithwaite et al. | |
| 2014/0064492 A1 | 3/2014 | Lakkundi et al. | |
| 2014/0328506 A1 | 9/2014 | Banks et al. | |
| 2015/0195651 A1 | 7/2015 | Boehlke | |
| 2015/0208187 A1 | 7/2015 | Carlsson et al. | |
| 2015/0208188 A1 | 7/2015 | Carlsson et al. | |
| 2015/0215723 A1 | 7/2015 | Carlsson et al. | |
| 2016/0014513 A1* | 1/2016 | McCoy | H04R 3/12 |
| | | | 381/79 |

* cited by examiner

SPEAKER DISCOVERY AND ASSIGNMENT

CROSS-REFERENCE TO RELATED APPLICATIONS

This application claims the benefit of U.S. Provisional Patent Application Ser. No. 62/045,954, filed Sep. 4, 2014 and U.S. Provisional Patent Application Ser. No. 62/099,957, filed Jan. 5, 2015, the entire disclosures of which are hereby incorporated herein by reference for all that they teach and for all purposes.

FIELD OF THE INVENTION

The present invention is generally directed toward wireless speaker discovery, configuration, connection, and the playback process.

BACKGROUND

When designing connection and pairing protocols, usability and security are top concerns. However, there tends to be a general lack of simplicity when it comes to setting up and configuring home theatre systems. In the ecosystem of home theatre systems for example, a more enjoyable experience will be had by the user when the amount of effort required by the user during a configuration process is minimal In addition, installing, running, and configuring speaker wires for use in home theatre systems may present a challenge for the user and may be a primary reason most users do not have a home theatre system. However, designing a system that requires minimal effort on the part of the user, is highly secure and usable, and is easy to install and configure, is often difficult and costly.

SUMMARY

It is, therefore, one aspect of the present disclosure to provide a system and method used to connect wireless speakers to a host device and allow the user to discover, configure, and use the speakers. Such a system and method maintains a level of security while enhancing usability and overall user experience.

In accordance with embodiments of the present disclosure, a device for assigning one or more discovered wireless speakers to a speaker location is provided. The device may include a processor and memory. The memory may contain processor executable instructions that when executed, cause the processor to: discover one or more wireless speakers, output to a display device, a speaker diagram illustrating a speaker configuration, wherein the speaker configuration includes a plurality of speaker locations, receive a selection of a speaker location from the plurality of speaker locations, output to the display device, a list of wireless speakers, wherein the list of wireless speakers corresponds to the discovered one or more wireless speakers, receive a selection of a wireless speaker from the list of wireless speakers, and associate the selected wireless speaker to the selected speaker location.

In accordance with embodiments of the present disclosure, a method of assigning one or more discovered wireless speakers to a speaker location is provided. The method may comprise discovering one or more wireless speakers, displaying, at an output device, a speaker diagram illustrating a speaker configuration, wherein the speaker configuration includes a plurality of speaker locations, receiving a selection of a speaker location from the plurality of speaker locations, displaying, to the output device, a list of wireless speakers, wherein the list of wireless speakers corresponds to the discovered one or more wireless speakers, receiving a selection of a wireless speaker from the list of wireless speakers, and associating the selected wireless speaker to the selected speaker location.

In accordance with embodiments of the present disclosure, a tangible non-transitory computer-readable medium storing instructions thereon to discover and assign one or more wireless speakers is provided. The instructions, when executed on a processor, cause the processor to discover one or more wireless speakers, display a speaker diagram illustrating a speaker configuration, wherein the speaker configuration includes a plurality of speaker locations, receive a selection of a speaker location from the plurality of speaker locations, display, to an output device, a list of wireless speakers, wherein the list of wireless speakers corresponds to the discovered one or more wireless speakers, receive a selection of a wireless speaker from the list of wireless speakers, and assign the selected wireless speaker to the selected speaker location.

In accordance with at least one embodiment, an audio tone to be emitted from the selected wireless speaker. In accordance with at least one embodiment, at least one visual indicator located on the speaker may be turned on and/or off. In accordance with at least one embodiment, the speaker configuration is based on a number of discovered wireless speakers. In accordance with at least one embodiment, a selection of a second speaker location from the plurality of speaker locations may be received, the list of wireless speakers may be displayed to an output device, a selection of a second wireless speaker from the list of wireless speakers may be received, and the selected second wireless speaker may be assigned to the selected second speaker location. In accordance with at least one embodiment, multi-channel audio content may be received from an audio source, a first channel of the multi-channel audio content may be transmitted to the first wireless speaker, and the second channel of the multi-channel audio content may be transmitted to the second wireless speaker. In accordance with at least embodiment, the first and second wireless speakers may be associated to a first speaker group and the second wireless speaker may be associated to a second speaker group.

The Summary is neither intended nor should it be construed as being representative of the full extent and scope of the present invention. The present invention is set forth in various levels of detail in the Summary, the attached drawings, and in the detailed description of the invention, and no limitation as to the scope of the present invention is intended by either the inclusion or non-inclusion of elements, components, etc. in the Summary. Additional aspects of the present invention will become more readily apparent from the detailed description, particularly when taken together with the drawings.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including, but not limited to, non-volatile media, volatile media, and transmission media. Non-volatile media includes, for example, NVRAM or magnetic or optical disks. Volatile media includes dynamic memory, such as main memory. Common forms of computer-readable media include, for example, a floppy disk, a flexible disk, hard disk, solid-state drive (SSD), magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine," "calculate," and "compute," and variations thereof, as used herein, are used interchangeably and include any type of methodology, process, mathematical operation or technique.

The term "module" as used herein refers to any known or later-developed hardware, software, firmware, artificial intelligence, fuzzy logic, or combination of hardware and software that is capable of performing the functionality associated with that element. Also, while the invention is described in terms of exemplary embodiments, it should be appreciated that an individual aspect of the invention can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
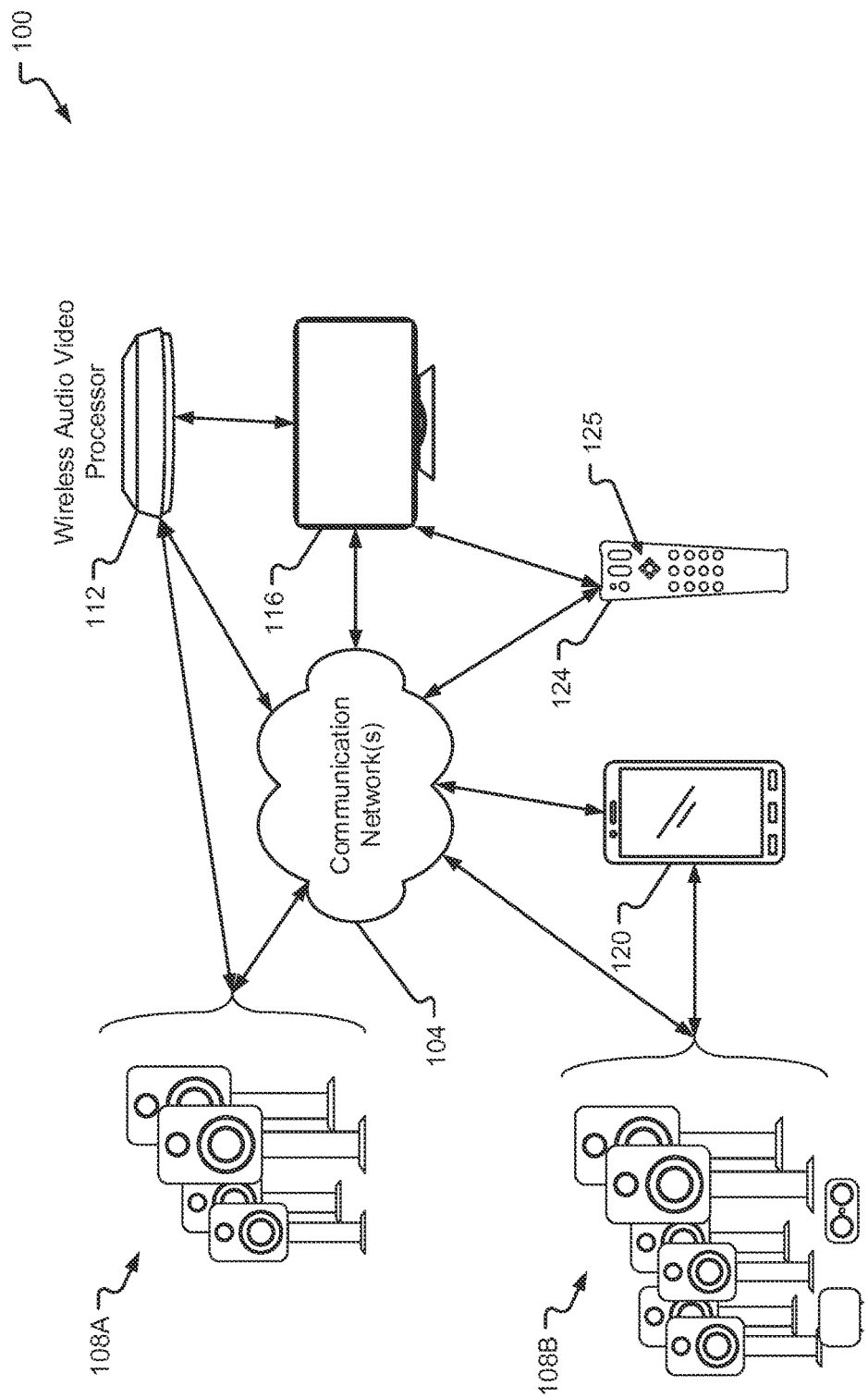
FIG. 1 depicts a wireless audio/video distribution system in accordance with at least some embodiments of the present disclosure.

Referring initially to FIG. 1, details of a wireless audio/video distribution system 100 are depicted in accordance with at least some embodiments of the present disclosure. The wireless audio/video distribution system 100 generally provides time-synchronized wireless audio to one or more zones, or groups, of wireless audio speakers. The wireless audio/video distribution system 100 may include one or more communication networks 104, one or more speaker groups 108A-108B having one or more speakers, one or more wireless audio/video processors 112, one or more televisions 116, one or more mobile devices 120, and one or more remote controls 124 interacting with or otherwise configuring the audio/video processing unit 112, the television 116, and/or the one or more speaker groups 108A-108B.

The one or more communication networks 104 may comprise any type of known communication medium or collection of communication media and may use any type of known protocols to transport messages between endpoints. The communication network 104 is generally a wireless communication network employing one or more wireless communication technologies; however, the communication network 104 may include one or more wired components and may implement one or more wired communication technologies. The Internet is an example of the communication network that constitutes an Internet Protocol (IP) network consisting of many computers, computing networks, and other communication devices located all over the world, which are connected through many networked systems and other means. Other examples of components that may be utilized within the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network need not be limited to any one network type, and instead may be comprised of a number of different networks and/or network types. The communication network 104 may further comprise, without limitation, one or more Bluetooth networks implementing one or more current or future Bluetooth standards, one or more device-to-device Bluetooth connections implementing one or more current or future Bluetooth standards, wireless local area networks implementing one or more 802.11 standards, such as and not limited to 802.11a, 802.11b, 802.11c, 802.11g, 802.11n, 802.11ac, 802.11as, and 802.11v standards, and/or one or more device-to-device Wi-Fi-direct connections.

Referring again to FIG. 1, the mobile device 120 may be associated with a user and may correspond to any type of known communication equipment or collection of communication equipment operatively associated with at least one communication module and antenna or transceiver. The mobile device 120 may be any device for carrying out functions, instructions, and/or may be utilized to communicate with the audio/video processing unit 112, and/or directly with the one or more speakers and/or speaker groups 108A-108B utilizing communication network 104 and/or a direct connection, via Bluetooth, Wi-Fi Direct, a propriety direct connection, or otherwise. Examples of a suitable mobile device 120 may include, but are not limited to, a personal computer, laptop, Personal Digital Assistant (PDA), cellular phone, smart phone, tablet, mobile computing device, handheld radio, dedicated mobile device, and/or combinations thereof. In general, the mobile device 120 is capable of providing one or more audio streams to one or more speakers and/or one or more speaker groups 108A-108B. The mobile device 120 may optionally have a user interface to allow a user to interact with the mobile device 120. The user interface may optionally allow a user to make configuration changes to one or more speakers and/or one or more speaker groups 108A-108B directly or indirectly. For example, the user may utilize the mobile device 120 to interact with and/or otherwise navigate a speaker setup process. As another example, the mobile device 120 may be utilized to interface with, and/or navigate, an onscreen display provided at least in part by the audio/video processing unit 112.

Speaker groups 108A-108B may be a collection of one or more speakers capable of receiving, playing, and/or transmitting audio information. The audio information may comprise one or more digital audio streams or one or more multichannel digital audio streams that are received from a variety of connected devices, such as mobile device 120 and/or the audio/video processing unit 112. The audio information may be encrypted, encoded, and/or provided as a protected content stream. In some embodiments, and in accordance with the present disclosure, the digital audio stream may be a Bluetooth Audio stream, which may be compressed utilizing one or more compression CODECs, such as, but not limited to, MPEG. The Bluetooth Audio stream may be sent to a processor or microcontroller within a speaker of the speaker group 108A-108B, where the audio stream may be decoded and separated into a number of discrete individual channels. These channels may include, but are not limited to, Stereo, Stereo with Subwoofer, Dolby or DTS 5.1 Surround Sound, and/or any other multichannel or mono formats. That is, the speaker groups 108A-108B may utilize a varying number of speakers and provide a varying number of configurations with a varying number of channels.

Once the individual channels are extracted and decoded, one of the channels may be played back on the local speaker. Other channels may be sent to any number of other speakers using a standard wireless protocol like WiFi. Each speaker may contain a Bluetooth radio and a WiFi radio for transmitting and receiving the digital audio streams such that each speaker may play back one or more channels of audio. Standard Internet Protocol may be used to assign IP addresses to each speaker for communication purposes and a universally unique identifier (UUID) assigned to each speaker, via the simple service discovery protocol (SSDP), may be used to identify and assign the audio channel each speaker is assigned to or is playing back.

Referring again to FIG. 1, remote control device 124 may be operative to communicate a command to a peripheral device to elicit functionality of the peripheral device. The remote control device 124 is able to store, serve, compute, communicate, and/or display information to enable a user to control one or more peripheral devices, such as the television 116, the audio/video processing unit 112, and/or one or more speakers of the one or more speaker groups 108A-108B. Although remote control device 124 is depicted as a standalone remote control device, such remote control functionality may be provided in and from a mobile device, such as mobile device 120. The remote control device 124 may include one or more navigation buttons 125, such as up, down, left, right, and select/enter buttons.

The wireless audio/video processing unit 112 provides coded and/or decoded audio data, such as, but not limited to, pulse code modulated integrated interchip sound (PCM/I2S) audio data, to one or more speakers of the speaker groups 108A-108B utilizing one or more wireless protocols. That is, the wireless audio/video processing unit 112 does not use a physical connection to the one or more speakers of the speaker groups 108A-108B as a medium for transmitting the wireless audio. As previously mentioned, the audio data may be provided in a PCM format; however, in some embodiments, the audio data may be provided in formats other than PCM. Alternatively, or in addition, the audio data may be provided in both PCM format and formats other than PCM.

Figure 2:
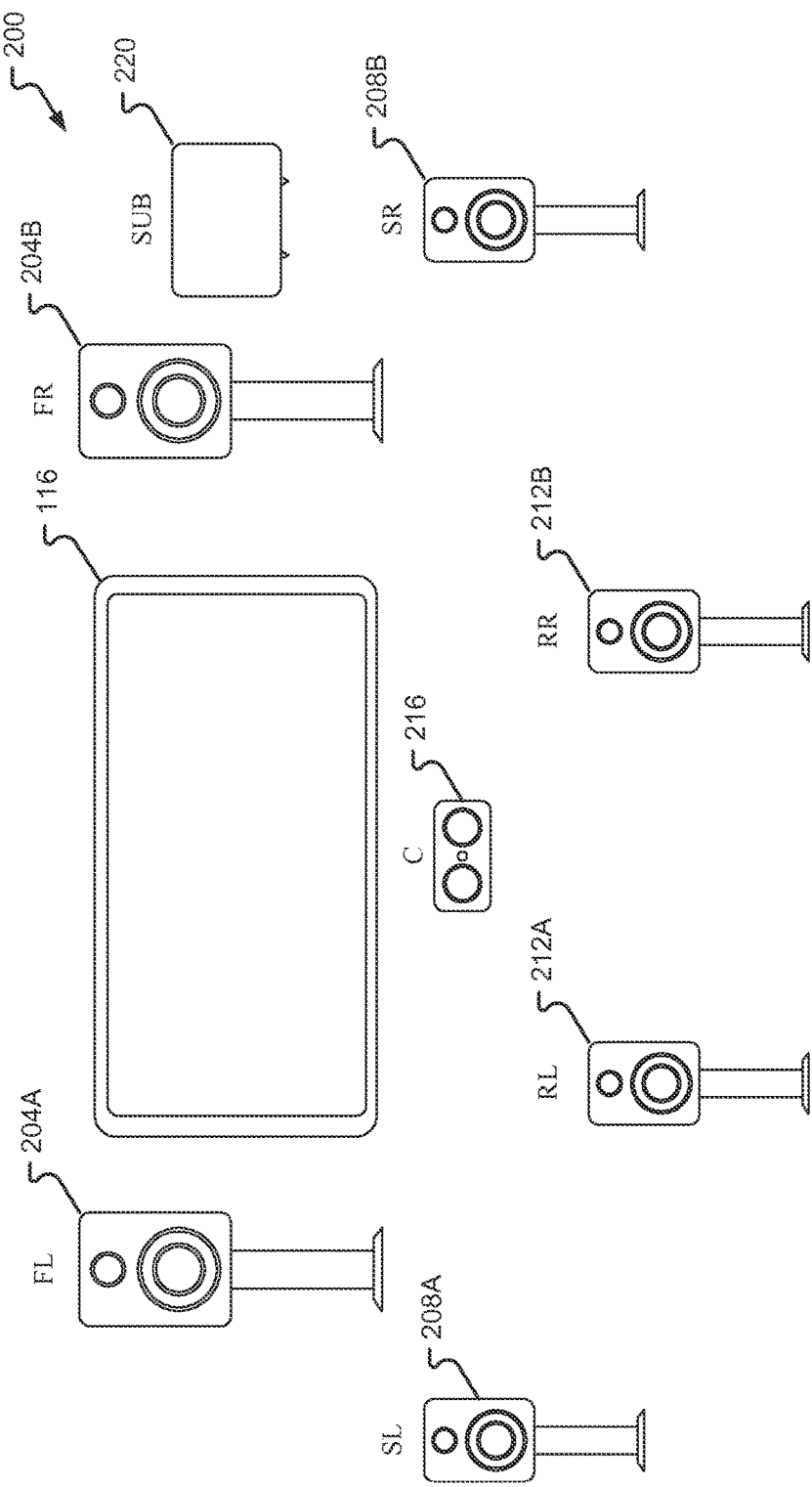
FIG. 2 depicts one or more speaker configurations in accordance with at least some embodiments of the present disclosure.

FIG. 2 illustrates one or more speaker configurations 200 in accordance with embodiments of the present disclosure. That is, speaker groups 108A-108B may utilize a configuration similar to or the same as that which is illustrated in speaker configuration 200. The speaker configuration 200 generally represents a 7.1 surround sound configuration having a front left speaker 204A, a front right speaker 204B, a side left speaker 208A, a side right speaker 208B, a rear left speaker 212A, a rear right speaker 212B, a center speaker 216, and a subwoofer 220. Speaker configuration 200 generally represents an eight-channel surround audio system commonly used in home theatre configurations. Although illustrated as including eight speakers and eight channels, speaker configuration 200 may be of a different surround sound configuration and include more or less than eight speakers and eight channels. Alternatively, or in addition, more than one speaker may be assigned to the same channel. For example, in a 7.2 surround sound configuration, two subwoofers may be utilized to increase, or otherwise enhance, the bass. In some embodiments, one or more speakers and/or one or more channels may be utilized based on an exact location of the speaker. That is, in some circumstances, one or more speakers and one or more corresponding channels may be utilized to provide precise sounds from specific locations to simulate select sounds, such as a helicopter, rain, or other sounds that may or may not include a specific positional component.

Figure 3:
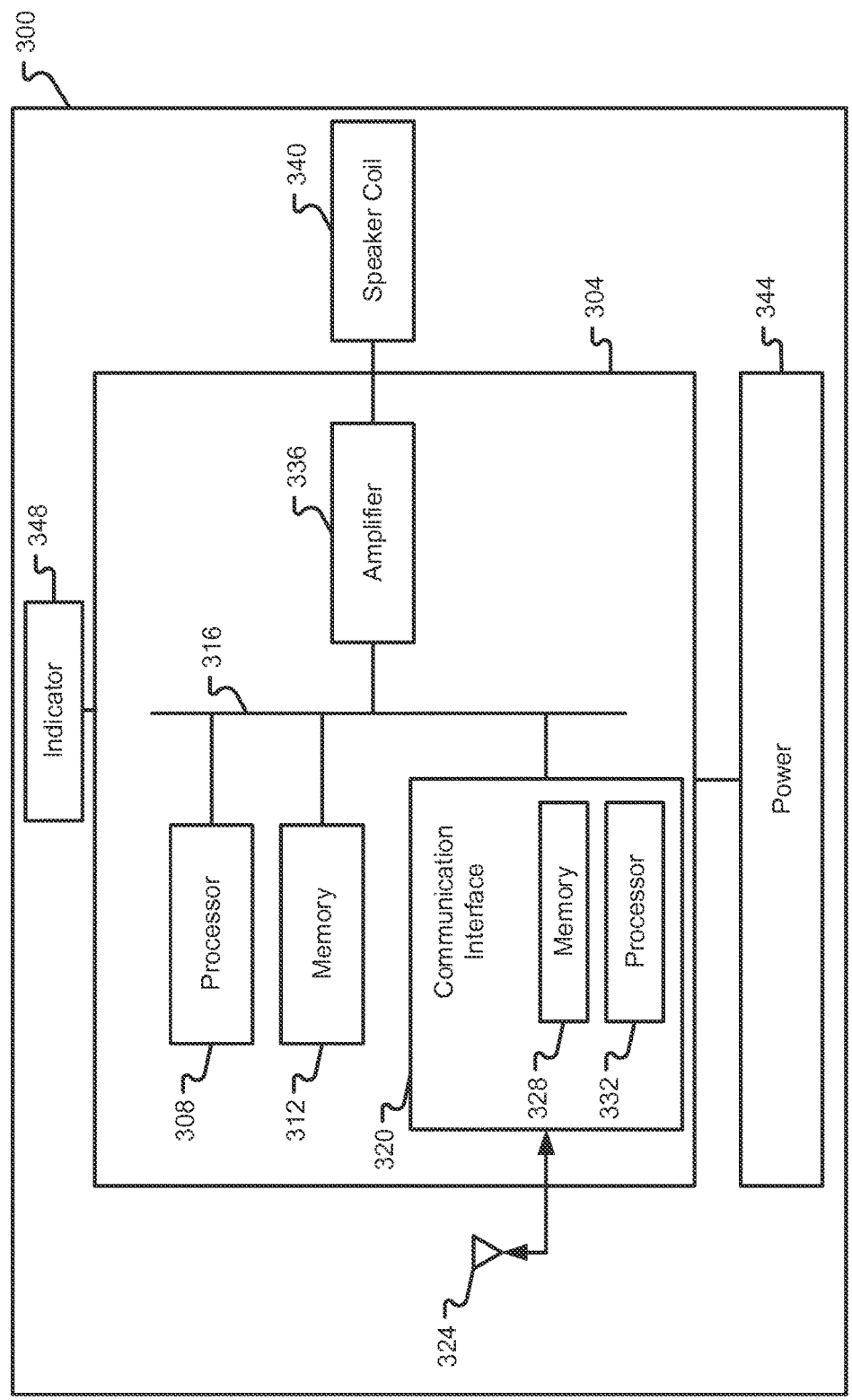
FIG. 3 is a block diagram depicting details of a speaker in accordance with at least some embodiments of the present disclosure.

FIG. 3 illustrates details of one or more speakers 300 in accordance with embodiments of the present disclosure. Speaker 300 may be the same as or similar to one or more speakers illustrated in speaker configuration 200, one or more speakers in speaker groups 108A-108B, and/or one or more speakers referred to throughout the present disclosure. In particular, speaker 300 may include, but is not limited to, speaker electronics 304, which include a processor 308, a memory 312, a communication interface 320, an antenna 324, and an amplifier 336. The speaker 300 may also include one or more mechanical speaker drivers 340 and a power source 344. Processor 308 is provided to execute instructions contained within memory 312. Accordingly, the processor 308 may be implemented as any suitable type of microprocessor or similar type of processing chip, such as any general-purpose programmable processor, digital signal processor (DSP), or controller for executing application programming contained within memory 312. Alternatively, or in addition, the processor 308 and memory 312 may be replaced or augmented with an application specific integrated circuit (ASIC), a programmable logic device (PLD), or a field programmable gate array (FPGA).

The memory 312 generally comprises software routines facilitating, in operation, pre-determined functionality of the speaker 300. The memory 312 may be implemented using various types of electronic memory generally including at least one array of non-volatile memory cells (e.g., Erasable Programmable Read Only Memory (EPROM) cells or flash memory cells, etc.) The memory 312 may also include at least one array of Dynamic Random Access Memory (DRAM) cells. The content of the DRAM cells may be pre-programmed and write-protected thereafter, whereas other portions of the memory may selectively be modified or erased. The memory 312 may be used for either permanent data storage or temporary data storage.

The communication interface(s) 320 may be capable of supporting multichannel audio, multimedia, and/or data transfers over a wireless network. Alternatively, or in addition, the communications interface 320 may comprise a Wi-Fi, BLUETOOTH™, WiMax, infrared, NFC, and/or other wireless communications links. The communication interface 320 may be associated with one or more shared or a dedicated antenna 324. The type of medium used by the speaker 300 to communicate with other speakers 300, mobile communication devices 120, and/or the audio/video processing unit 112, may depend upon the communication application's availability on the speaker 300 and/or the availability of the communication medium.

The communication interface 320 may also include one or more memories 328 and one or more processors 332. The processor 332 may be the same as or similar to that of the processor 308 while memory 328 may be the same as or similar to that of the memory 312. That is, the processor 332 is provided to execute instructions contained within the memory 328. Accordingly, the processor 332 may be implemented as any suitable type of microprocessor or similar type of processing chip, such as any general-purpose programmable processor, digital signal processor (DSP) or controller for executing application programming contained within memory 328. Alternatively, or in addition, the processor 332 and memory 328 may be replaced or augmented with an application specific integrated circuit (ASIC), a programmable logic device (PLD), or a field programmable gate array (FPGA).

The memory 328 generally comprises software routines facilitating, in operation, pre-determined functionality of the communication interface 320. The memory 328 may be implemented using various types of electronic memory generally including at least one array of non-volatile memory cells (e.g., Erasable Programmable Read Only Memory (EPROM) cells or flash memory cells, etc.). The memory 328 may also include at least one array of Dynamic Random Access Memory (DRAM) cells. The content of the DRAM cells may be pre-programmed and write-protected thereafter, whereas other portions of the memory may be selectively modified or erased. The memory 328 may be used for either permanent data storage or temporary data storage. The processor 308, memory 312, communication interface 320, and amplifier 336 may communicate with one another over one or more communication buses or connection 316.

Referring again to FIG. 3, the speaker 300 may include one or more amplifiers 336 that may amplify a signal associated with audio data to be output via one or more speaker coils 340. In some embodiments and consistent with the present disclosure, the speaker 300 may include one or more amplifiers 336, speaker coils 340, and/or speaker assemblies directed to one or more specific frequency ranges. For example, the speaker 300 may include an amplifier and/or speaker coil to output sounds of a low frequency range, an amplifier and/or speaker coil to output sounds of a medium frequency range, and/or an amplifier and/or speaker coil to output sounds of a high frequency range.

Speaker 300 may also include one or more power sources 344 for providing power to the speaker 300 and the components included in speaker 300. The power source 344 may be one of many power sources. Though not illustrated, the speaker 300 may also include one or more locating or location systems. In accordance with embodiments of the present disclosure, the one or more locating systems may provide absolute location information to other components of the wireless audio/video distribution system 100. In some embodiments, a location of the speaker 300 may be determined by the device's location-based features, a location signal, and/or combinations thereof. The location-based features may utilize data from one or more systems to provide speaker location information. For example, a speaker's location may be determined by an acoustical analysis of sound emanating from the speaker in reference to a known location. In some embodiments, sound emanating from the speaker may be received by a microphone. Accordingly, the acoustical analysis of the received sound, with reference to a known location, may allow one or more systems to determine a location of the speaker. The speaker 300 may additionally include an indicator 348 which may be utilized to visually identify the speaker 300 during a speaker assignment process.

In some embodiments, the speaker 300 may implement no management itself Rather, the association of speakers to groups and their locations may be kept track of by a host device, such as speaker 300, an audio/video processing unit 112, a mobile device 120 and/or combinations thereof. That is, the speaker plays whatever is sent to it and it is up to the host to decide which channel to send to a specific speaker and when the speaker plays back the specific audio channel.

Figure 4:
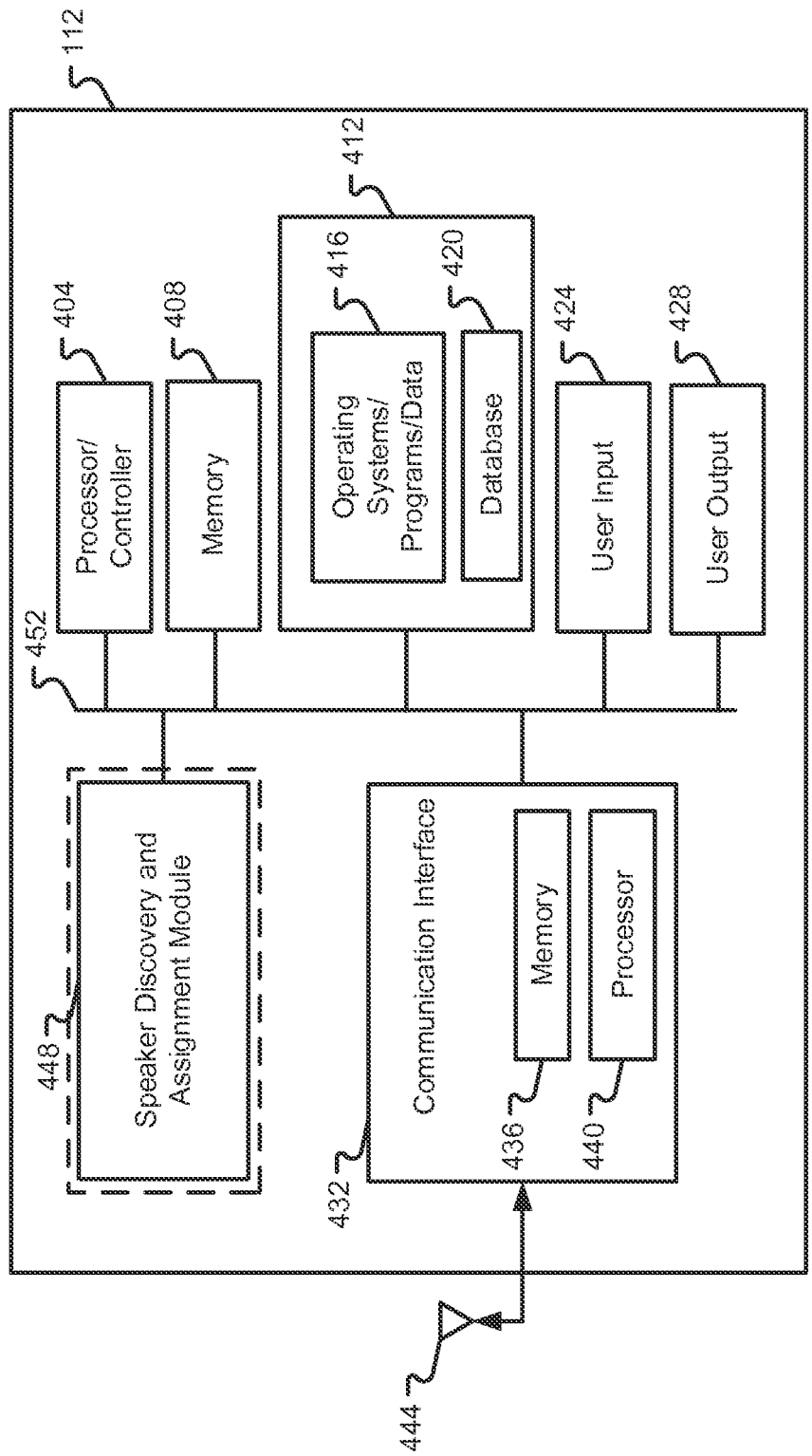
FIG. 4 is a block diagram depicting details of an audio/video processor (AVP) in accordance with at least some embodiments of the present disclosure.

FIG. 4 illustrates a block diagram of one or more audio/video processing unit(s) 112 in accordance with embodiments of the present disclosure. The audio/video processing unit 112 may include a processor/controller 404, memory 408, storage 412, user input 424, user output 428, a communication interface 432, antenna 444, a speaker discovery and assignment module 448, and a system bus 452. The processor 404 may be implemented as any suitable type of microprocessor or similar type of processing chip, such as any general-purpose programmable processor, digital signal processor (DSP) or controller for executing application programming contained within memory 408. Alternatively, or in addition, the processor 404 and memory 408 may be replaced or augmented with an application specific integrated circuit (ASIC), a programmable logic device (PLD), or a field programmable gate array (FPGA).

The memory 408 generally comprises software routines facilitating, in operation, pre-determined functionality of the audio/video processing unit 112. The memory 408 may be implemented using various types of electronic memory generally including at least one array of non-volatile memory cells (e.g., Erasable Programmable Read Only Memory (EPROM) cells or flash memory cells, etc.). The memory 408 may also include at least one array of Dynamic Random Access Memory (DRAM) cells. The content of the DRAM cells may be pre-programmed and write-protected thereafter, whereas other portions of the memory may be selectively modified or erased. The memory 408 may be used for either permanent data storage or temporary data storage.

Alternatively, or in addition, data storage 412 may be provided. The data storage 412 may generally include storage for programs and data. For instance, with respect to the audio/video processing unit 112, data storage 412 may provide storage for a database 420. Data storage 412 associated with an audio/video processing unit 112 may also provide storage for operating system software, programs, and program data 416.

Similar to the communication interface 320, the communication interface(s) 432 may be capable of supporting multichannel audio, multimedia, and/or data transfers over a wireless network. The communication interface 432 may comprise a Wi-Fi, BLUETOOTH™, WiMax, infrared, NFC, and/or other wireless communications links. The communication interface 432 may include a processor 440 and memory 436; alternatively, or in addition, the communication interface 432 may share the processor 404 and memory 408 of the audio/video processor 112. The communication interface 432 may be associated with one or more shared or dedicated antennas 444. The communication interface 432 may additionally include one or more multimedia interfaces for receiving multimedia content. As one example, the communication interface 432 may receive multimedia content utilizing one or more multimedia interfaces, such as a high-definition multimedia interface (HDMI), coaxial interface, and/or similar media interfaces. Alternatively, or in addition, the audio/video processing unit 112 may receive multimedia content from one or more devices utilizing the communication network 104, such as, but not limited to, mobile device 120 and/or a multimedia content provider.

In addition, the audio/video processing unit 112 may include one or more user input devices 424, such as a keyboard, a pointing device, and/or a remote control 124. Alternatively, or in addition, the audio/video processing unit 112 may include one or more output devices 428, such as a television 116 and/or a speaker 300. A user input 424 and user output 428 device can comprise a combined device, such as a touch screen display. Moreover, the user input 424 device may generate one or more graphical user interfaces for display on the television 112 or other device while the user output device 428 may receive input from the graphical user interface and/or a combination of the graphical user interface and another input device, such as the remote control 124.

Figure 5:
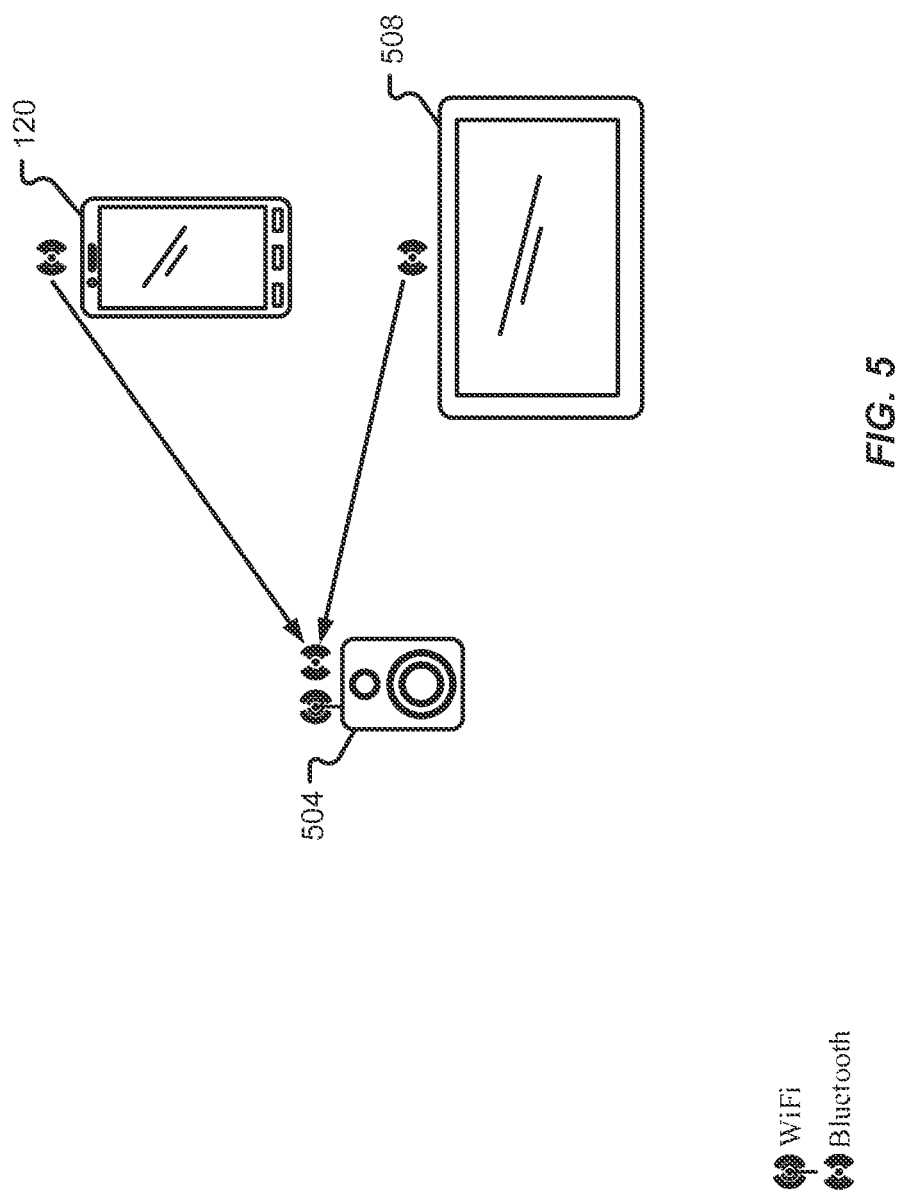
FIG. 5 depicts a first configuration of a wireless audio/video distribution system in accordance with at least some embodiments of the present disclosure.

FIG. 5 provides details of one or more configurations that facilitate a speaker to be used in multiple wireless configurations and in accordance with embodiments of the present disclosure. The ability to operate in many different configurations allows the user to purchase one speaker and use the speaker for many different purposes, saving money and the need to acquire many speakers for different uses. Speakers can also be configured on the fly so a speaker being used for one purpose can be changed to another use as required. The speakers may utilize one or both of Bluetooth™ and Wi-Fi for this purpose. For example, as illustrated in FIG. 5, the speaker 504 uses its Bluetooth radio to receive streamed audio, like those available in MP3 format, from a variety of sources, including mobile devices, such as, but not limited to, mobile devices 120 and/or tablet 508, which stream audio from their libraries or from the Internet, for example. The streamed audio is played back through the speaker's included amplifiers and loudspeakers, such as those described with respect to FIG. 3. Alternatively, or in addition, the mobile devices 120 and/or table 508 may communicate with the speaker 504 utilizing the previously described communication network 104 and/or a direct connection, such as Bluetooth™ and/or WiFi direct.

Figure 6:
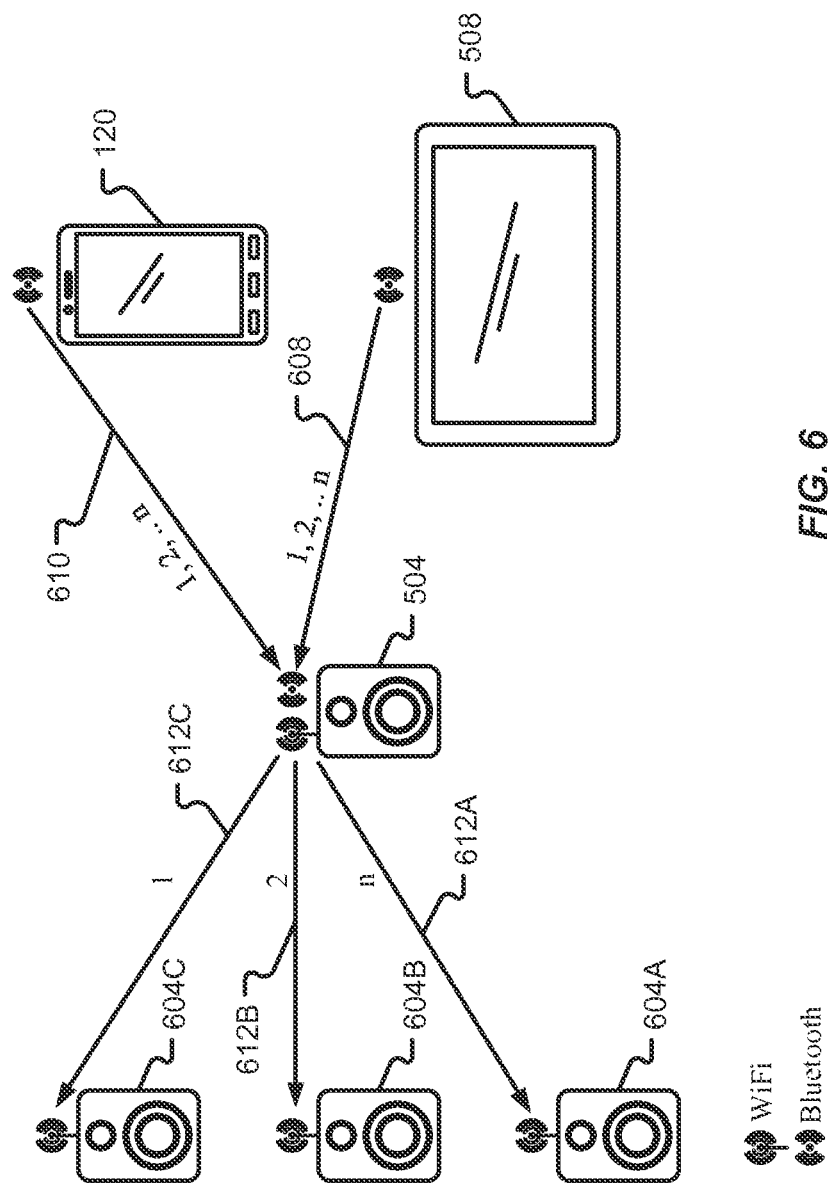
FIG. 6 depicts a second configuration of a wireless audio/video distribution system in accordance with at least some embodiments of the present disclosure.

FIG. 6 provides details of one or more configurations that facilitate a speaker to be used in multiple wireless configurations in accordance with embodiments of the present disclosure. Further, FIG. 6 provides at least one example in which the speakers 504 and/or 604A-604C can also be configured on the fly. For example, as illustrated in FIG. 6, the same speaker 504 may be used to play back multichannel audio from a streamed source like those available in MP3 format, from a variety of sources, including mobile devices, such as mobile device 120 and/or tablet 508, which stream audio from their libraries or from the Internet. A processor or microcontroller, such as processor 308, is used to separate the received streamed audio file into multiple discrete channels, such as and not limited to Stereo, Stereo with Subwoofer, Dolby or DTS 5.1 or 7.1 Surround Sound. Each audio channel may be sent to a different speaker for playback at a specific time using the included Wi-Fi radio to achieve the desired spatial effect of stereo or surround sound. Therefore, by playing all channels simultaneously, the desired spatial effect of stereo or surround sound may be realized.

More specifically, and as illustrated in FIG. 6, a mobile device, such as mobile device 120 and/or tablet 508, may provide a multichannel audio stream for playback in surround mode. The multichannel audio stream 608/610, includes multiple channels of audio, represented as 1, 2, . . . n. Processor 308 of speaker 504 may then separate the received audio stream 608/610 into multiple discrete channels 612 and provide the discrete multiple channels 612A-612C to their respective speakers 604A-604C; the timing at which the discrete multiple channels 612A-612C are played at each speaker 504 and 604A-604C is critical. Although FIG. 6 illustrates an example configuration in which speaker 504 receives the multi-channel audio stream 608/610 via Bluetooth™ and transmits the discrete audio channels 612A-612C via Wi-Fi, the exact wireless communication technology, standard, or network may be different. That is, references to Bluetooth™ and WiFi are for illustrative purposes and illustrate at least one configuration; other forms of wireless communication are contemplated. Alternatively, or in addition, the mobile devices 120 and/or tablet 508 may communicate with speakers 504 and 604A-604C, utilizing the previously described communication network 104 and/or a direct connection, such as Bluetooth™ and/or WiFi direct and the speaker 504 communicates with each of the speakers 604A-C, utilizing the previously described communication network 104 and/or a direct connection, such as Bluetooth™ and/or WiFi direct.

Figure 7:
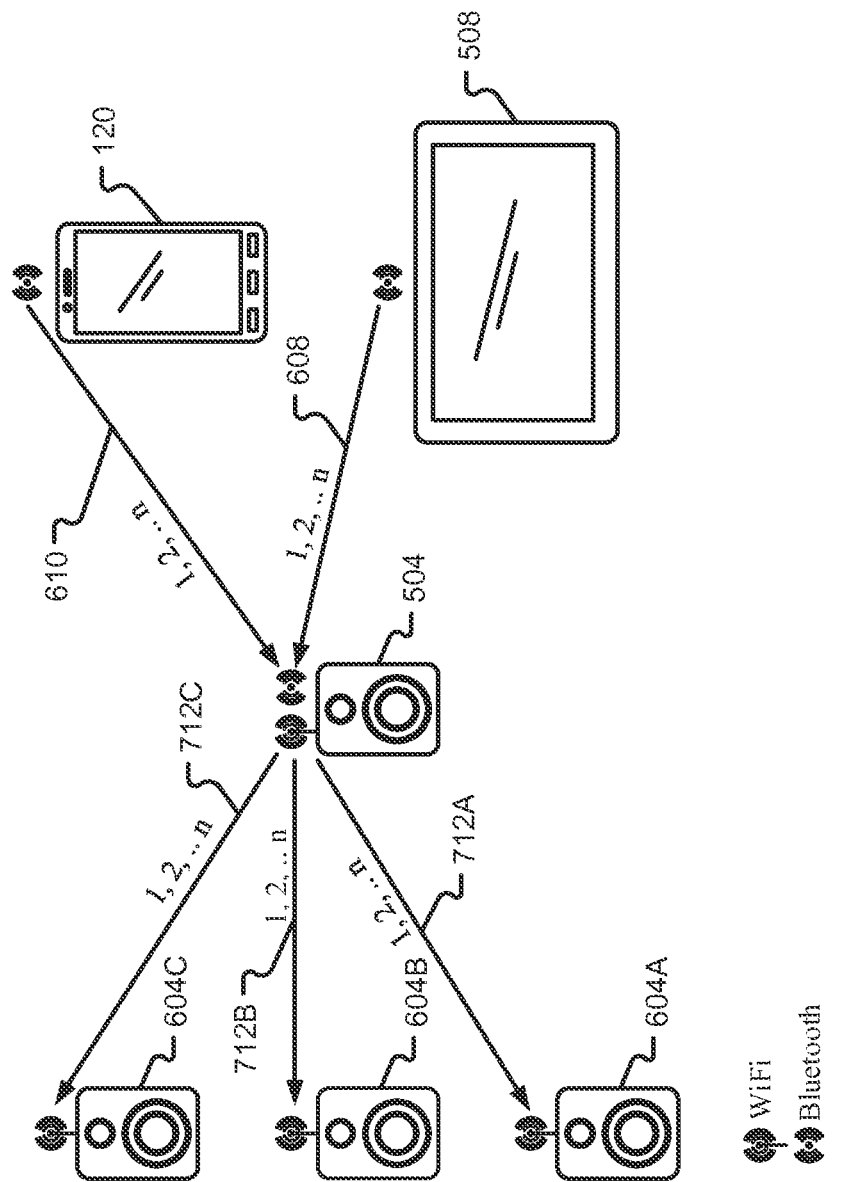
FIG. 7 depicts a third configuration of a wireless audio/video distribution system in accordance with at least some embodiments of the present disclosure.

Alternatively, or in addition, FIG. 7 provides additional details of one or more configurations that facilitate a speaker to be used in multiple wireless configurations in accordance with embodiments of the present disclosure. Further, FIG. 7 provides at least one example in which the speakers 504 and/or 604A-604C can also be configured on the fly. For example, as illustrated in FIG. 7, the same speaker 504 may be used to play back multichannel audio from a streamed source like those available in MP3 format, from a variety of sources, including mobile devices, such as mobile device 120 and/or tablet 508, which stream audio from their libraries or from the Internet. In such a configuration, instead of separating the received streamed audio file into multiple discrete channels, the speaker 504 simply forwards on the received audio stream. Accordingly, each speaker 604A-604C receives the audio stream, and the processor 308 of each speaker 604A-604C may separate, identify, and utilize a specific audio channel according to one or more channel and speaker assignments. By playing all channels simultaneously, with each channel playback time synchronized with the others, the desired spatial effect of stereo or surround sound may be realized.

More specifically, and as illustrated in FIG. 7, a mobile device, such as mobile device 120 and/or tablet 508, may provide a multichannel audio stream for playback in surround mode. The multichannel audio stream 608/610, includes multiple channels of audio, represented as 1, 2, . . . n. Speaker 504 may receive the multichannel audio stream 608/610, identify one or more channels of audio that have been assigned to it, separate the assigned audio channel, and then play the assigned audio channel at a synchronized timing. Speaker 504 may forward or transmit the received multichannel audio stream 608/610 to speakers 604A-604C as multichannel audio streams 712A-712C. Processor 308 of each speaker 604A-604C may then identify, separate, and play one or more channels of the multichannel audio stream that has been assigned to the respective speaker. Accordingly, by playing all channels simultaneously, with each channel playback time synchronized with the others, the desired spatial effect of stereo or surround sound may be realized. Although FIG. 7 illustrates an example configuration in which speaker 504 receives the multi-channel audio stream 608/610 via Bluetooth™ and transmits the multichannel audio streams 712A-712C via Wi-Fi, the exact wireless communication technology, standard, or network may be different. That is, references to Bluetooth™ and WiFi are for illustrative purposes and illustrate at least one configuration; other forms of wireless communication are contemplated. Alternatively, or in addition, the mobile devices 120 and/or tablet 508 may communicate with speakers 504, utilizing the previously described communication network 104 and/or a direct connection, such as Bluetooth™ and/or WiFi direct and the speaker 504 communicates with each of the speakers 604A-C, utilizing the previously described communication network 104 and/or a direct connection, such as Bluetooth™ and/or WiFi direct.

Figure 8:
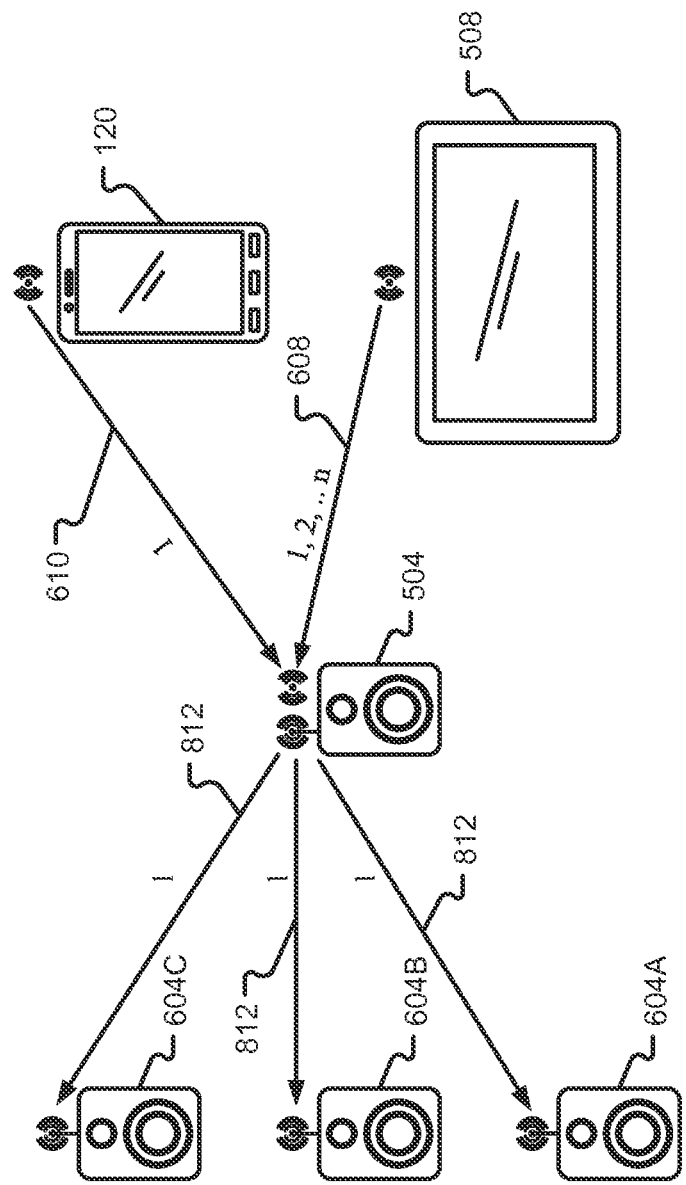
FIG. 8 depicts a fourth configuration of a wireless audio/video distribution system in accordance with at least some embodiments of the present disclosure.

FIG. 8 illustrates a configuration in which the digital audio stream is not separated into channels but is combined to become monaural. That is, the multichannel digital audio stream 608/610 is received from the connected device, such as the mobile device 120 and/or the tablet 508, via Bluetooth™. A monaural stream 812 may then be transmitted via Wi-Fi to any number of speakers for simultaneous playback. That is, in such a configuration, the same speaker may be used in an array of speakers to play back monaural audio from a streamed source like those available in MP3format, from a variety of sources, including mobile devices, which stream audio from their libraries or from the Internet. In this case, all speakers may play the same audio simultaneously to cover a large area like a whole house or outdoor party with sound. The audio file may be streamed from its source to a speaker using Bluetooth™ and the audio content is then sent to other speakers using a standard wireless protocol like Wi-Fi. Although FIG. 8 illustrates an example configuration where speaker 504 receives the multi-channel audio stream 608/610 via Bluetooth™ and transmits a monaural audio stream 812 via Wi-Fi, the exact wireless communication technology, standard, or network may be different. That is, references to Bluetooth™ and WiFi are for illustrative purposes only and illustrate at least one configuration; other forms of wireless communication are contemplated. Alternatively, or in addition, the mobile devices 120 and/or tablet 508 may communicate with speakers 504, utilizing the previously described communication network 104 and/or a direct connection, such as Bluetooth™ and/or WiFi direct and the speaker 504 communicates with each of the speakers 604A-C, utilizing the previously described communication network 104 and/or a direct connection, such as Bluetooth™ and/or WiFi direct.

Figure 9:
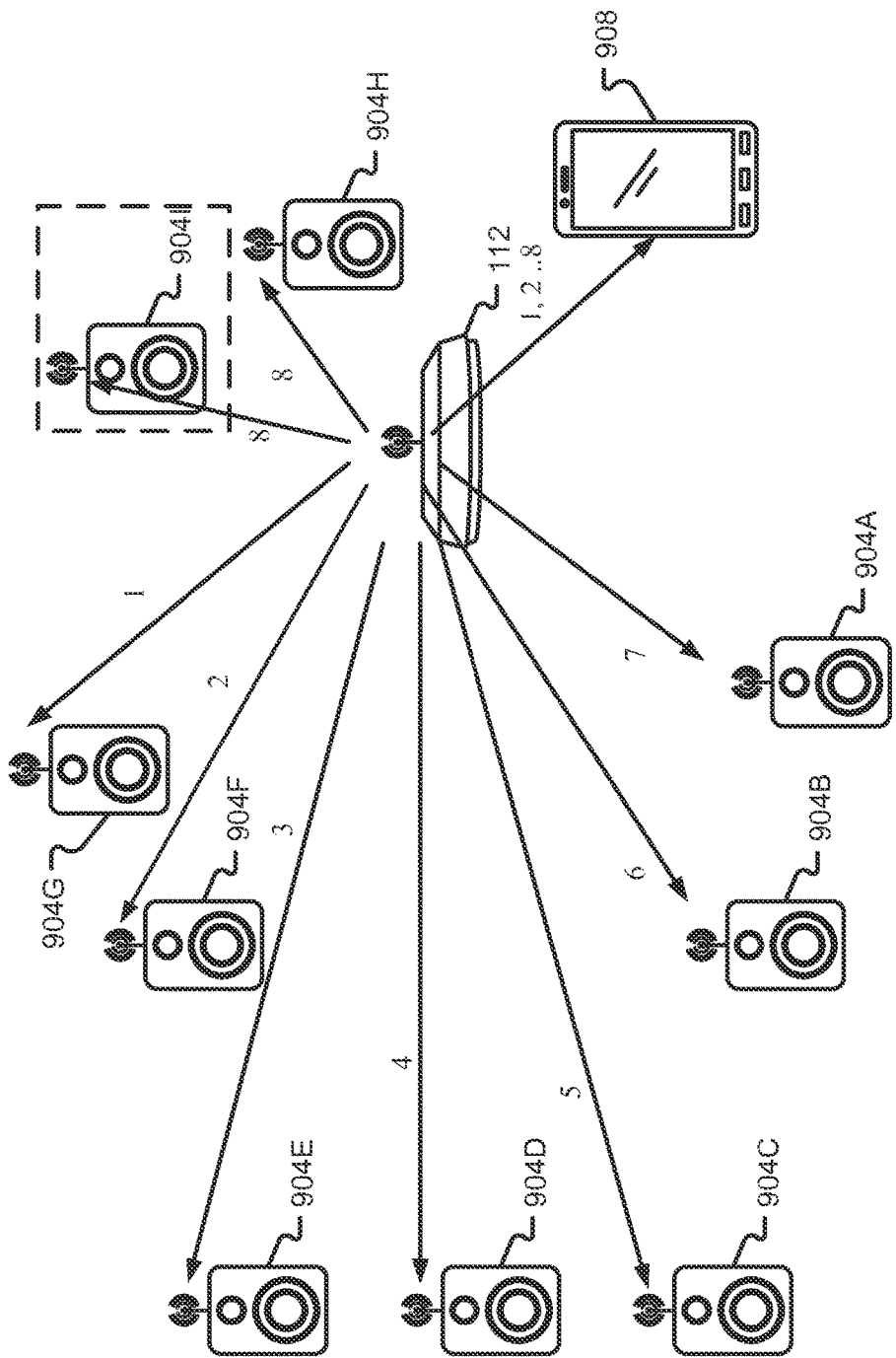
FIG. 9 depicts a fifth configuration of a wireless audio/video distribution system in accordance with at least some embodiments of the present disclosure.

FIG. 9 illustrates another example configuration in accordance with embodiments of the present disclosure. More specifically, the audio/video processing unit 112 may separate the audio received from one or more sources into discrete channels and provide the discrete channels to their respective speakers 904A-904I. As one example, the audio/video processing unit 112 may receive or otherwise access an audio stream for a movie or other multimedia source. The audio stream may be provided from a television 116, from a content provider such as Netflix® or Hulu®, from a multimedia source local in communication with the communication network 104, from a multimedia instance resident on and/or directly accessible by the audio/video processing unit 112, and/or the like. For example, within the storage 412, multimedia content, such as, but not limited to, a multimedia file and/or a portion of a multimedia file, may be stored, accessed, and decoded by the audio/video processing unit 112. An audio stream associated with the multimedia file may be separated into one or more audio channels for playback at the one or more speakers 904A-904I accordance with a specified and/or predetermined speaker configuration. For example, in accordance with a 7.1 surround sound configuration, such as the configuration illustrated in FIG. 2, the audio stream for the multimedia content may be separated into discrete channels 1, 2, 3, 4, 5, 6, 7, and 8, each of which may be received and played back at a specific time and at a respective speaker 904A-I to achieve the desired spatial effect of stereo or surround sound. Therefore, by playing all channels simultaneously, the desired spatial effect of stereo or surround sound may be realized. The exact wireless communication technology, standard, or network may be different than that which is illustrated in FIG. 9. That is, references to Wi-Fi are for illustrative purposes only and illustrate at least one configuration; other forms of wireless communication are contemplated.

Further, and as illustrated in FIG. 9, the audio/video processing unit 112 may provide the same audio stream to more than one speaker. For instance, speaker 904H and 904I may receive the same audio stream. In such an instance, a single location, for example a location associated with speakers 904H and 904I, may have multiple speakers assigned to it. In such a configuration, multiple speakers associated with a single location may increase the impact of a stereo system. For example, a user may utilize multiple subwoofers for the added effect of more bass. Such a configuration may also be associated with a predetermined or preselected speaker configuration, for example, but not limited to, a 7.2 speaker configuration as previously discussed.

In addition, mobile device 908, which may be the same as or similar to the mobile device 120, may be utilized as an additional speaker or endpoint. As one example, the mobile device 908 may be connected to a communication network 104 or otherwise accessible by the audio/video processing unit 112. The mobile device 908 may then receive content from the audio/video processing unit 112 and the audio, including one or more audio channels, may be played out via a speaker of the mobile device 908 and/or through a headphone jack of the mobile device 908. For instance, at night when a user is in bed and the user's significant other wants to go to sleep, the user may continue to watch multimedia content, such as a movie or other content displayed on the television 116. In such an instance, the user may wear headphones and configure the audio/video processing system 112 to send the audio to the user's mobile device 908. Accordingly, the user can watch the video on the TV screen and listen to the audio using headphones while not disturbing the user's sleeping partner.

Figure 10:
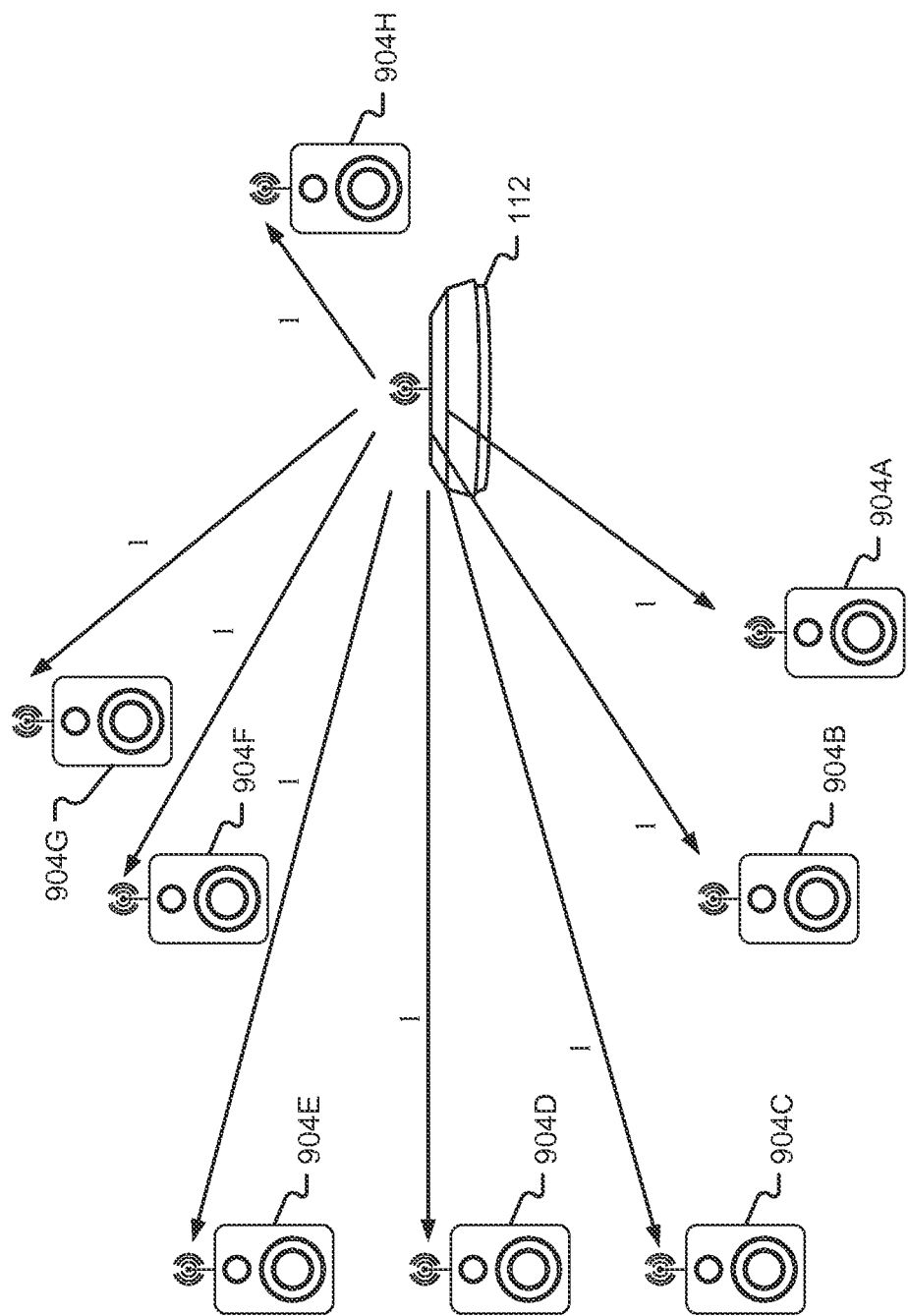
FIG. 10 depicts a sixth configuration of a wireless audio/video distribution system in accordance with at least some embodiments of the present disclosure.

Similar to the configuration of FIG. 8, FIG. 10 illustrates a configuration in which the speakers 904A-H may be configured such that all speakers 904A-H play back monaural audio simultaneously, as described above, to cover a large area like a whole house or outdoor party with sound. As one example, the audio/video processing unit 112 may receive or otherwise access an audio stream for a song or other audio content. The audio stream may be provided from a television 116, from a content provider such as Netflix® or Hulu®, from a multimedia source local in communication with the communication network 104, from a multimedia instance resident on and/or directly accessible by the audio/video processing unit 112, and/or the like. For example, within the storage 412, a song, such as, but not limited to, an audio file and/or a portion of an audio file, may be stored, accessed, and decoded by the audio/video processing unit 112. An audio stream associated with the audio file may be configured as a monaural audio stream for playback at the one or more speakers 904A-H in accordance with a specified and/or predetermined speaker configuration. For example, the monaural audio stream may include a single channel for playback at a specific time and at a respective speaker 904A-H, to achieve the desired spatial effect. For example, by playing the monaural audio simultaneously at all, or some, speakers, a desired "party mode" configuration and the sound associated therewith may be realized. The exact wireless communication technology, standard, or network may be different than that which is illustrated in FIG. 10. That is, references to Wi-Fi are for illustrative purposes only and illustrate at least one configuration; other forms of wireless communication are contemplated.

Figure 11:
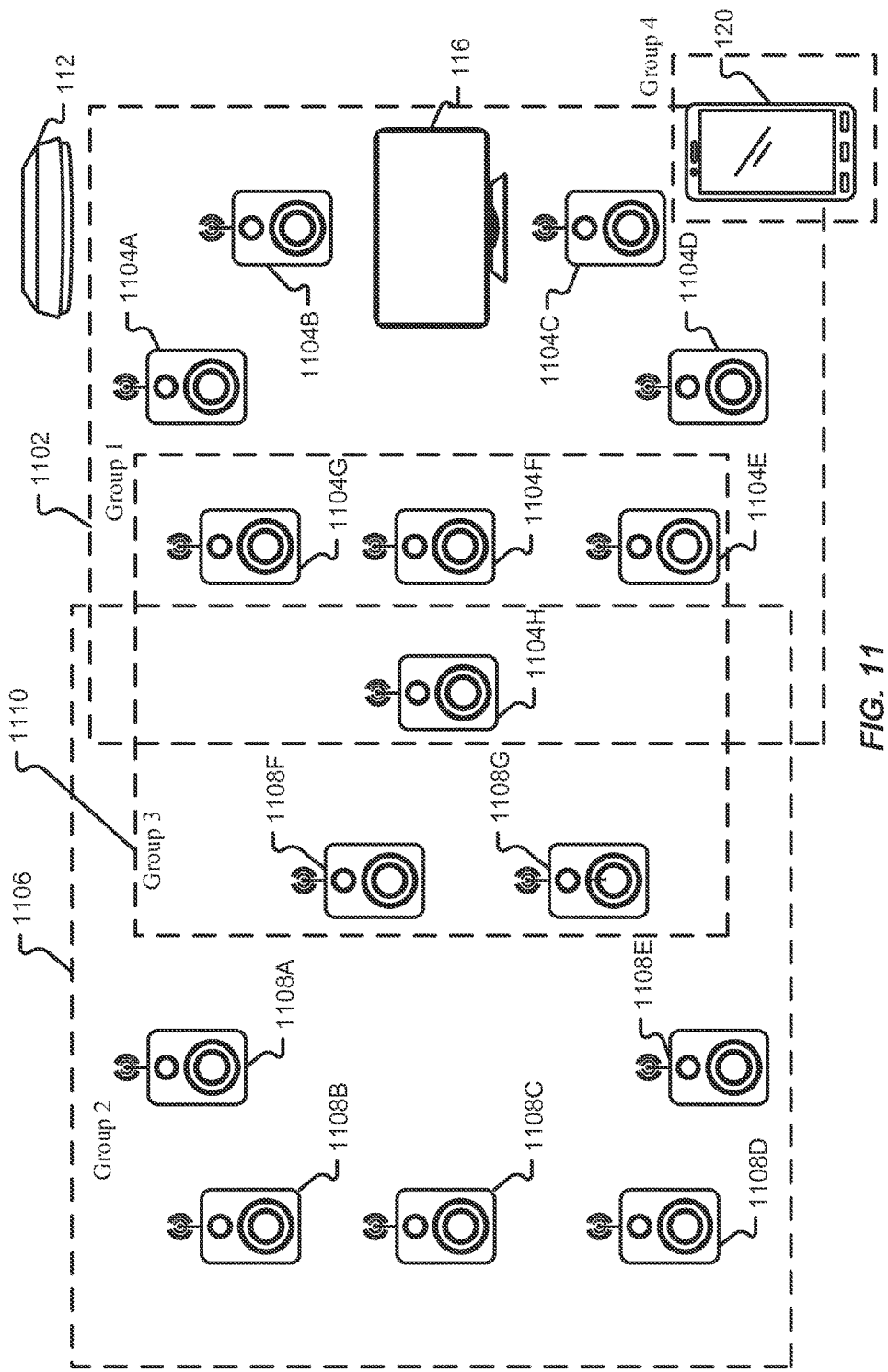
FIG. 11 depicts a seventh configuration of a wireless audio/video distribution system in accordance with at least some embodiments of the present disclosure.

FIG. 11 provides an example configuration whereby the speakers may be reconfigured on the fly and used in multi-room zones, also referred to as groups. For example, speakers used for rear surround sound in a 7.1 configuration may be rapidly reconfigured to play back stereo sound in another room leaving the original speakers in a 5.1 configuration. Speakers used for 7.1 and/or those used in a stereo application may be rapidly reconfigured to all play in party mode, all playing monaural audio simultaneously. For example, and as illustrated in at least FIG. 11, speakers 1104A-1104H may be utilized in a typical eight channel eight speaker 7.1 stereo audio configuration and may be designated as a first group (or zone), or group (zone) 1 1102. The grouping of speakers 1104A-1104H may correspond to a grouping of speakers in a first room or for a first purpose. In another configuration, group (zone) 2 1106 may include speakers 1108A-1108F, but lack an eighth speaker for a full 7.1 stereo audio configuration. Accordingly, speaker 1104H may be reconfigured on the fly, and added to the group (zone) 2, if needed, such that group (zone) 2, including speakers 1108A-1108F and 1104H, may be utilized as a typical eight channel eight speaker 7.1 stereo audio configuration. As another example, a group (zone) 3 1110 may include a sub-grouping of speakers from both groups (zone) 1 1102 and group (zone) 2 1106. That is, in another configuration, speakers 1108F, 1108G, 1104E-1104F may be utilized as a typical six channel six speaker 5.1 stereo audio configuration. Such groupings may be utilized with mobile device 120 and/or audio/video processing unit 112, for example.

Alternatively, or in addition, mobile device 120 may be utilized as an additional speaker or endpoint as previously discussed. For example, a single group (zone) such as group (zone) 4 may include the mobile device 120. Accordingly, the mobile device 120 may then receive content from the audio/video processing unit 112 and the audio, including one or more audio channels, may be played out via a speaker of the mobile device 120 and/or through a headphone jack of the mobile device 120. In such an instance, the user may wear headphones and configure the audio/video processing system 112 to send the audio to the separate speaker group (zone) that includes the mobile device 120. Accordingly, the user can watch the video on the TV screen and listen to the audio using headphones connected to the mobile device 120.

In wired home theatre and sound systems, speaker assignment was generally effected by connecting a speaker of known location to a labeled output port on the back of a receiver or other device capable of driving such speaker. With the advent of wireless sound systems and wireless theatre systems capable of playing multi-channel audio, because there is no physical connection from the speaker to a device, such as a wireless audio/video processing unit 112, there becomes a need to assign each wireless speaker to a location/function associated with one or more speaker configuration groups, such as 7.1, 5.1, and 2.1. That is, once one or more speakers have been paired to the audio/video processing unit 112, each of the speakers may be assigned to a speaker location/function within a speaker group, or zone, configuration. For example, an explicit assignment for a side left speaker 208A needs to be made in order for the audio/video processing unit 112 to be able to send or otherwise direct an audio stream to the side left speaker 208 for playback. Accordingly, FIGS. 12-14K provide additional details with respect to one or more processes for assigning speaker locations.

Figure 12:
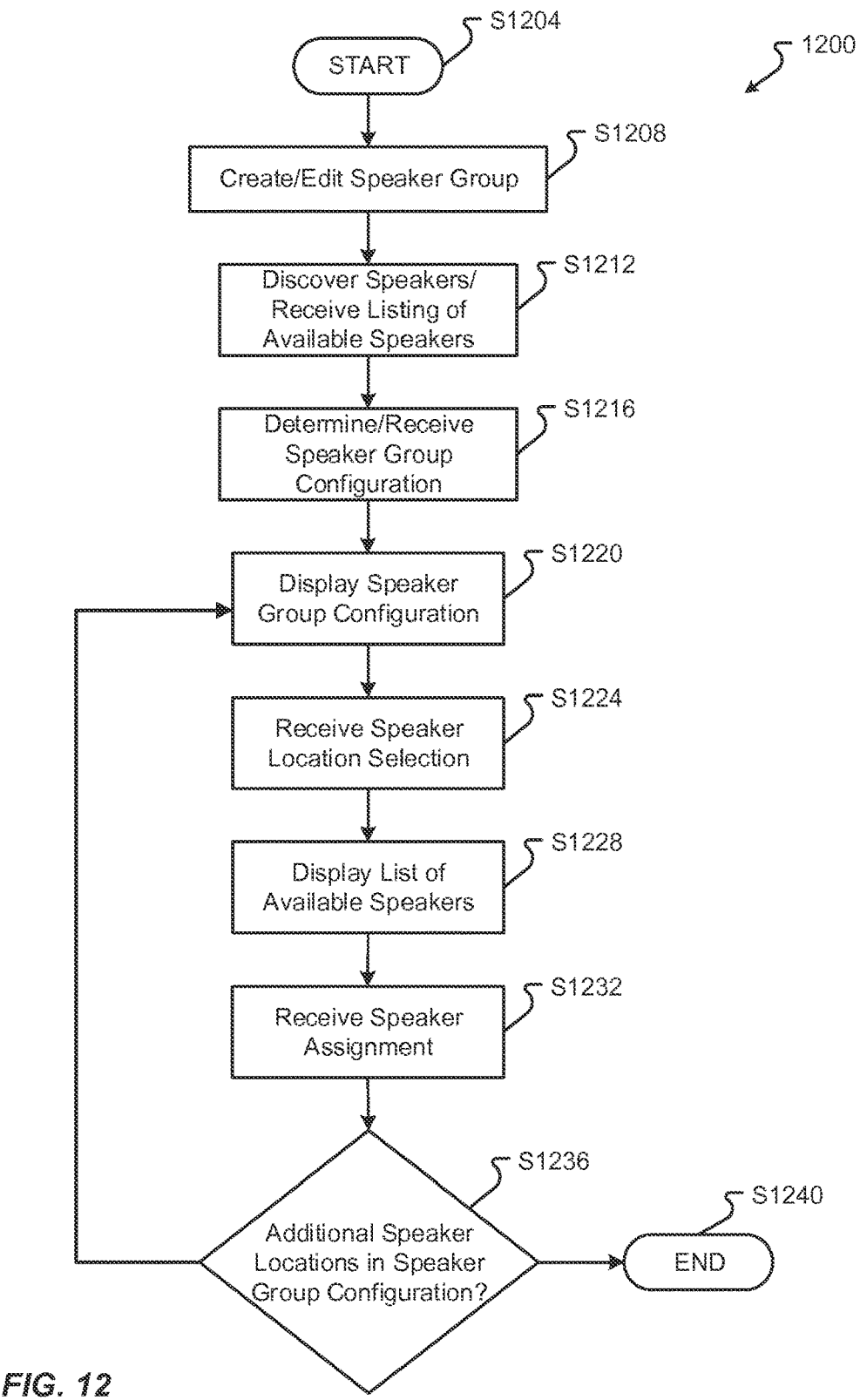
FIG. 12 is a flow diagram depicting a first speaker assignment process in accordance with at least some embodiments of the present disclosure.

Referring now to FIG. 12, a flow diagram depicting a first speaker assignment process, also referred to as method 1200, in accordance with at least some embodiments of the present disclosure, is provided. Method 1200 is in embodiments, performed by one or more devices, such as an audio/video processing unit 112, a television 116 or other display device, a speaker device 300, and/or combinations thereof. More specifically, one or more hardware and software components may be involved in performing method 1200. In one embodiment, one or more of the previously described units, or devices, perform one or more of the steps of method 1200. The method 1200 may be executed as a set of computer-executable instructions executed by at least one of the audio/video processing units 112 and encoded or stored on a computer-readable medium. Hereinafter, the method 1200 shall be explained with reference to systems, components, units, software, etc. described with respect to FIGS. 1-11.

Method 1200 may continuously flow in a loop, flow according to a timed event, or flow according to a change in an operating or status parameter. Method 1200 may be initiated at step S1204 where a user may wish to perform an initial setup of a speaker group, also referred to as a speaker zone, edit an existing speaker group or speaker zone, and/or perform an out of the box configuration of a speaker, for example to add a speaker to an existing speaker group or zone. At step S1208, a speaker group, or zone, may be named and/or identified. For example, in embodiments where a speaker group is being created, a name uniquely identifying the speaker group may be utilized. The name may be entered by the user, for example utilizing a remote control 124 and/or a mobile device 120 to select and then enter a group or zone name. Alternatively, or in addition, in embodiments where a speaker group is being edited, a user may select a previously created name uniquely identifying a previously created speaker group or zone. Method 1200 may then move to step S1212 wherein a listing of available speakers may be obtained. The listing of available speakers may be provided as an output and displayed on a television 116 and/or other display device, such as a display of the mobile device 120. The speakers contained in the listing of available speakers may include only those speakers currently not assigned to a group. Alternatively, or in addition, the listing of available speakers may include all speakers currently paired and/or discoverable by the audio/video processing unit 112. For example, a speaker discovery and pairing process may have been previously completed in order to pair one or more speakers to the audio/video processing unit 112, or otherwise make the speakers available for use by the audio/video processing unit 112. Accordingly, the audio/video processing unit 112 may maintain a list of speakers currently and/or previously paired with the audio/video processing unit 112. As previously discussed, such a list may be presented to the user, or otherwise rendered to a display, such as a television 116 and/or a display of a mobile device 120. The audio/video processing unit 112 may directly render the output or cause another device to render the output relying on information provided by the audio/video processing unit 112.

Method 1200 may then proceed to step S1216 where a speaker configuration may be obtained. Non-limiting examples of speaker configurations include 7.1, 5.1, and 2.1. In some embodiments, a "custom" speaker configuration may be utilized. For example, a user may wish to utilize a "party mode" speaker configuration where each speaker utilized plays the same monaural audio stream. At step S1216, the audio/video processing unit 112 may automatically select a predetermined speaker configuration based on a number and/or type of available speakers. For example, if eight speakers are discovered and/or provided in an available speaker list, the audio/video processing unit 112 may select a 7.1 speaker configuration. Alternatively, or in addition, if eight speakers are discovered and/or provided in an available speaker list, the audio/video processing unit 112 may automatically provide a 7.1 speaker configuration, a 5.1 speaker configuration, and/or a 2.1 speaker configuration for selection by a user. As another example, the speaker configuration may base a speaker configuration on the number and type of speakers provided in an available speaker list. For example, if two speakers are previously identified as front speakers (left/right), two speakers are identified as side speakers (left/right), two speakers are identified as rear speakers (left/right), one speaker is identified as a center speaker, and one speaker is identified as a subwoofer, the audio/video processing unit 112 may automatically select a 7.1 speaker configuration. Similarly, the audio/video processor 112 may provide all speaker configurations that are capable of being utilized given the number and type of speakers. Alternatively, or in addition, at step S1216, a user may be presented with one or more selectable speaker configurations. Such selectable speaker configurations may be presented on the television 116 and/or other display, such as a mobile device 120.

At step S1220, a speaker group configuration, similar to FIG. 2, may be displayed to a user. The audio/video processor 112 may render the display of the speaker group configuration and provide the rendering to a television 116 and/or other display device, such as mobile device 120. Alternatively, or in addition, the audio/video processing unit 112 may cause the display of the speaker group configuration to be rendered and displayed at the television 116 and/or other display, such as a display of the mobile device 120. At step S1224, and based on the display of the speaker group configuration, the audio/video processing unit 112 may receive a speaker location from the user. For example, and as will be discussed with respect to FIGS. 14A-K, the speaker group configuration displayed at step S1220 may allow a user to select one of a plurality of speaker locations. The selection of the speaker location will allow a user the ability to assign a speaker to the selected location, using for example, the remote control 124 and/or a mobile device 120. After receiving a speaker location selection from a user, a list of available speakers may be displayed to the user for assignment to the previously selected speaker location at step S1228. In some embodiments, as the user navigates through the list of available speakers, a tone may be played at the corresponding wireless speaker. Alternatively, or in addition, as the user navigates through the list of available speakers, an indicator, such as indicator 348, turns on, blinks, or otherwise provides an indication that the corresponding wireless speaker has been selected. At step S1232, a user may confirm the speaker assignment by selecting one or more available speakers from the list of available speaker, using for example, the remote control 124 and/or the mobile device 120. Upon selecting the one or more speakers, the one list of available speakers is updated with a corresponding location description related to the previously received speaker location selection of step S1224.

Method 1200 then proceeds to step S1236 where it is determined if there are additional locations in the previously selected speaker group configuration that need an assignment to a speaker; alternatively, or in addition, at step S1236 it is determined whether or not there are additional speakers in the available speaker list that need an assignment to a speaker location. If all speaker locations in a speaker configuration group or zone include an assigned speaker and/or if all speakers in the available speaker list have been assigned to a location in the speaker configuration group or zone, then the method 1200 ends at step S1240. Otherwise method 1200 may return to step S1220 where the speaker group configuration may be displayed once again to the user and steps S1220 to steps S1232 may be repeated.

Figure 13:
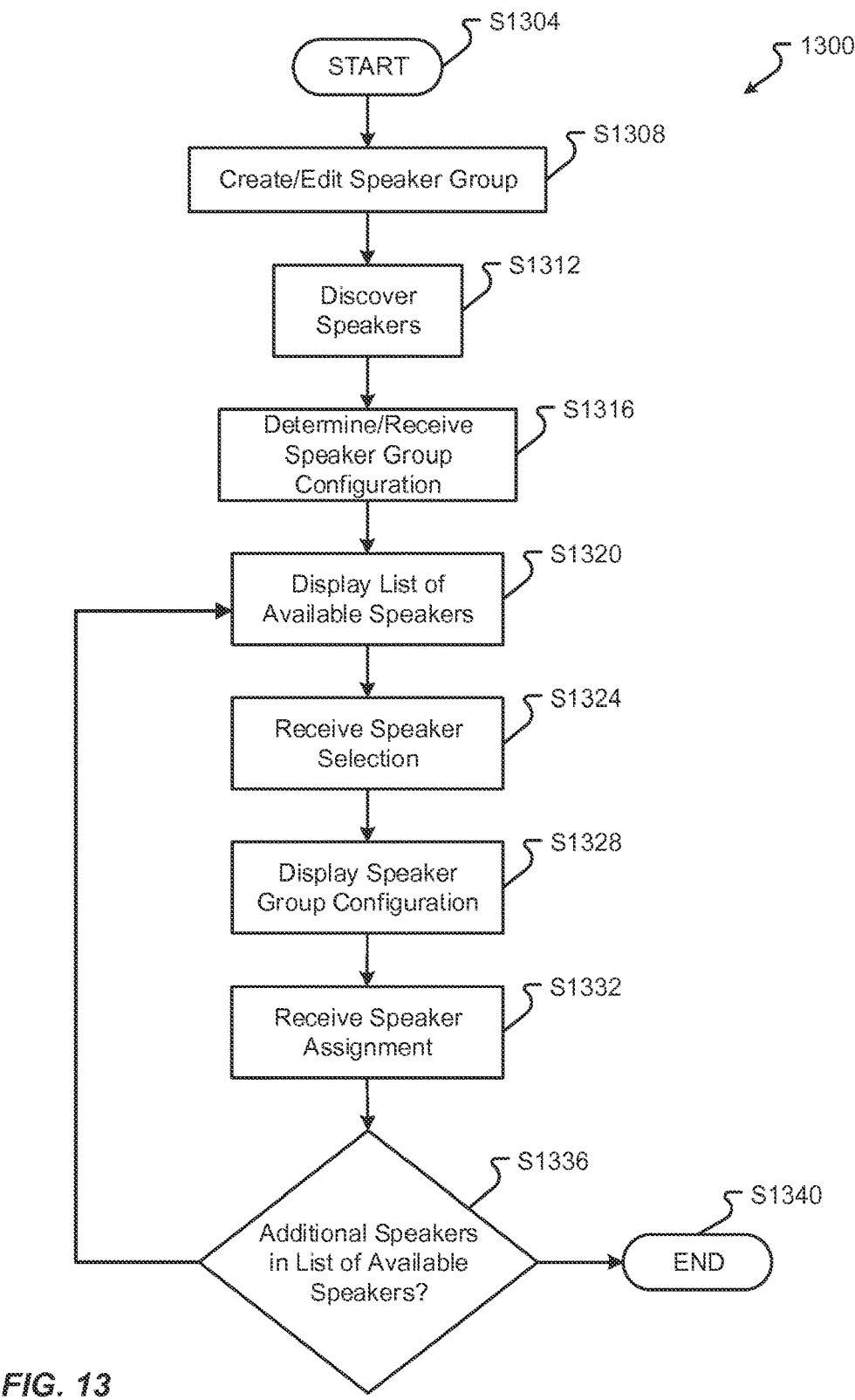
FIG. 13 is a flow diagram depicting a second speaker assignment process in accordance with at least some embodiments of the present disclosure.

Referring now to FIG. 13, a flow diagram depicting a second speaker assignment process, also referred to as method, in accordance with at least some embodiments of the present disclosure, is provided. Method 1300 is in embodiments, performed by one or more devices, such as an audio/video processing unit 112, a television 116 or other display device, a speaker device 300, and/or combinations thereof. More specifically, one or more hardware and software components may be involved in performing method 1300. In one embodiment, one or more of the previously described units, or devices, perform one or more of the steps of method 1300. The method 1300 may be executed as a set of computer-executable instructions executed by at least one of the audio/video processing units 112 and encoded or stored on a computer-readable medium. Hereinafter, the method 1300 shall be explained with reference to systems, components, units, software, etc. described with respect to FIGS. 1-12.

Method 1300 may continuously flow in a loop, flow according to a timed event, or flow according to a change in an operating or status parameter. Method 1300 differs from method 1200 in that instead of choosing a location and assigning an available speaker to the chosen location, a speaker is chosen and a chosen location is assigned to the selected speaker. Accordingly, method 1300 may be initiated at step S304 where a user may wish to perform an initial setup of a speaker group, also referred to as a speaker zone, edit an existing speaker group or speaker zone, and/or perform an out of the box configuration of a speaker, for example to add a speaker to an existing speaker group or zone. At step S1308, a speaker group, or zone, may be named and/or identified. For example, in embodiments where a speaker group is being created, a name uniquely identifying the speaker group may be utilized. The name may be entered by the user, for example utilizing a remote control 124 and/or a mobile device 120 to select and then enter a group or zone name. Alternatively, or in addition, in embodiments where a speaker group is being edited, a user may select a previously created name uniquely identifying a previously created speaker group or zone. Method 1300 may then move to step S1312 wherein a listing of available speakers may be obtained. The listing of available speakers may be provided as an output and displayed on a television 116 and/or other display device, such as a display of the mobile device 120. The speakers contained in the listing of available speakers may include only those speakers currently not assigned to a group. Alternatively, or in addition, the listing of available speakers may include all speakers currently paired and/or discoverable by the audio/video processing unit 112. For example, a speaker discovery and pairing process may have been previously completed in order to pair one or more speakers to the audio/video processing unit 112, or otherwise make the speakers available for use by the audio/video processing unit 112. Accordingly, the audio/video processing unit 112 may maintain a list of speakers currently and/or previously paired with the audio/video processing unit 112. As previously discussed, such a list may be presented to the user, or otherwise rendered to a display, such as a television 116 and/or a display of a mobile device 120. The audio/video processing unit 112 may directly render the output or cause another device to render the output relying on information provided by the audio/video processing unit 112.

Method 1300 may then proceed to step S1316 where a speaker configuration may be obtained. Non-limiting examples of speaker configurations include 7.1, 5.1, and 2.1. In some embodiments, a "custom" speaker configuration may be utilized. For example, a user may wish to utilize a "party mode" speaker configuration where each speaker utilized plays the same monaural audio stream. At step S1316, the audio/video processing unit 112 may automatically select a predetermined speaker configuration based on a number and/or type of available speakers. For example, if eight speakers are discovered and/or provided in an available speaker list, the audio/video processing unit 112 may select a 7.1 speaker configuration. Alternatively, or in addition, if eight speakers are discovered and/or provided in an available speaker list, the audio/video processing unit 112 may automatically provide a 7.1 speaker configuration, a 5.1 speaker configuration, and/or a 2.1 speaker configuration for selection by a user. As another example, the speaker configuration may base a speaker configuration on the number and type of speakers provided in an available speaker list. For example, if two speakers are previously identified as front speakers (left/right), two speakers are identified as side speakers (left/right), two speakers are identified as rear speakers (left/right), one speaker is identified as a center speaker and one speaker is identified as a subwoofer, the audio/video processing unit 112 may automatically select a 7.1 speaker configuration. Similarly, the audio/video processor 112 may provide all speaker configurations that are capable of being utilized given the number and type of speakers. Alternatively, or in addition, at step S1316, a user may be presented with one or more selectable speaker configurations. Such selectable speaker configurations may be presented on the television 116 and/or other display, such as a mobile device 120.

At step S1320, the list of available speakers may be provided to the user and the user may select a speaker. In some embodiments, as the user navigates through the list of available speakers, a tone may be played at the corresponding speaker. Alternatively, or in addition, as the user navigates through the list of available speakers, an indicator, such as indicator 348, turns on, blinks, or otherwise provides an indication that the corresponding wireless speaker has been selected. The list of speakers may contain all speakers currently paired with the audio/video processing unit 112. The audio/video processor 112 may render the list of available speakers and provide the rendering to a television 116 and/or other display device, such as mobile device 120.

Alternatively, or in addition, the audio/video processing unit 112 may cause the list of available speakers to be rendered and displayed at the television 116 and/or other display, such as a display of the mobile device 120. At step S1324, a user may confirm the speaker assignment by selecting one or more available speakers from the list of available speakers, using for example, the remote control 124 and/or the mobile device 120. The method 1300 may then proceed to step S1328 where the speaker group configuration may be displayed to the user. The speaker group configuration may be similar to FIG. 2, for example, in a 7.1 speaker configuration. The audio/video processor 112 may render the display of the speaker group configuration and provide the rendering to a television 116 and/or other display device, such as mobile device 120. Alternatively, or in addition, the audio/video processing unit 112 may cause the display of the speaker group configuration to be rendered and displayed at the television 116 and/or other display, such as a display of the mobile device 120. At step S1332, and based on the display of the speaker group configuration, the audio/video processing unit 112 may receive a speaker location from the user, wherein the received speaker location is then assigned to previously selected speaker. For example, and as will be discussed with respect to FIGS. 14A-K, the speaker group configuration displayed a step S1328 may allow a user to select one of a plurality of speaker locations. The selection of the speaker location will provide a user the ability to assign the previously selected speaker to the selected location, using for example, the remote control 124 and/or a mobile device 120. After receiving a speaker location selection from a user, method 1300 then proceeds to step S1336 where it is determined if there are additional non-assigned speakers in the list of available speakers. For example, if there are eight speakers in the available speaker list and only three speakers have been assigned, the method 1300 may proceed to step S1320 to assign the remaining speakers in the available speakers list to locations in the speaker configuration. If all speakers in the available speaker list have been assigned to a location in the speaker configuration group or zone and/or all locations in a speaker configuration group or zone include an assigned speaker, then the method 1300 ends at step S1340. Accordingly, in embodiments of the present disclosure, methods 1200 and 1300 may be utilized to assign speakers to speaker locations and/or speaker locations to speakers.

FIGS. 14A-14L generally depict an example speaker assignment process together with graphical user interfaces in accordance with at least some embodiments of the present disclosure. Each of the graphical user interfaces 1402A-L depicted in FIGS. 14A-14L may be rendered at the audio/video processing unit 112 and output to a television 116 and/or another display device, such as a mobile device 120. Alternatively, or in addition, the television 116 and/or other display device may render each of the graphical user interfaces 1402A-L depicted in FIGS. 14A-14L based on information and/or data provided by the audio/video processing unit 112.

Figure 14A:
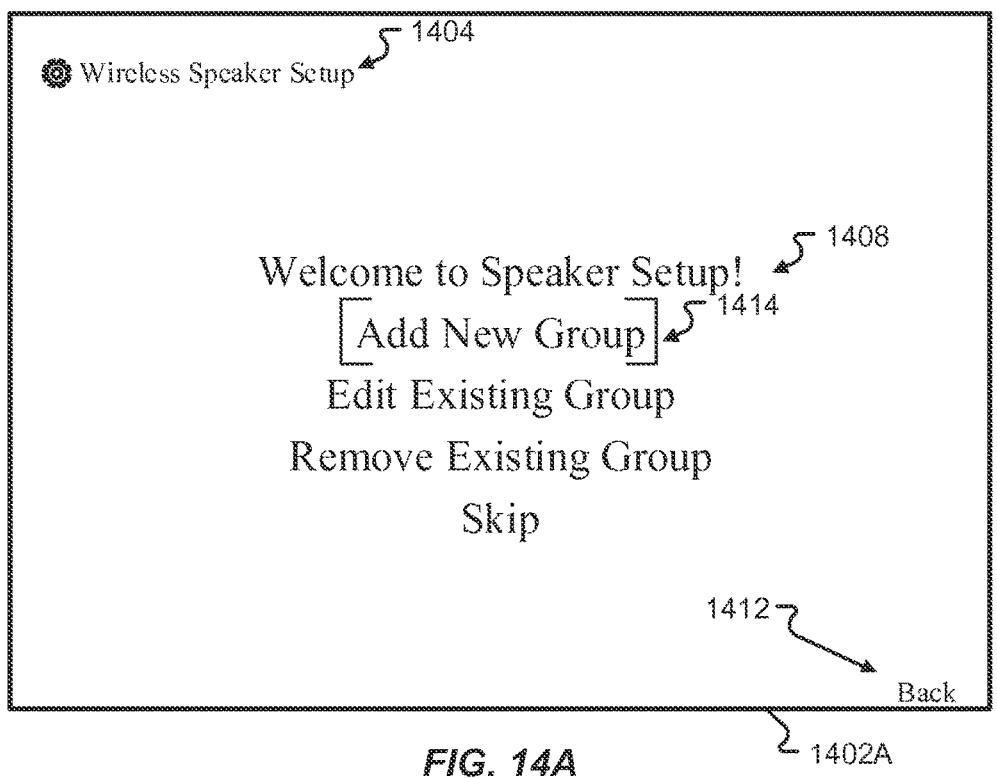
FIGS. 14A-14L depict an example speaker assignment process in accordance with at least some embodiments of the present disclosure.

FIG. 14A depicts a graphical user interface 1402A that may be utilized in a speaker setup process. The graphical user interface 1402A generally includes an identifier 1404 indicating a current state and/or process. For example, the identifier 1404 displays "wireless speaker setup" indicating that a user may have entered or otherwise is performing the wireless speaker setup process. Within the graphical user interface 1402A, one or more options 1408 may be presented to a user. To illustrate, the graphical user interface 1402A may allow a user to select an option to add a new group of speakers via "Add New Group," for example, by using a remote 124 and/or mobile device 120 to move a focus 1414 Other options, such as, but not limited to, editing an existing group, removing an existing group, and/or an option to skip the wireless speaker setup process are also presented to the user via the graphical user interface 1402A. In addition, the graphical user interface 1402A may similarly allow a user to select the "Back" option to return to a previous graphical user interface.

Figure 14B:
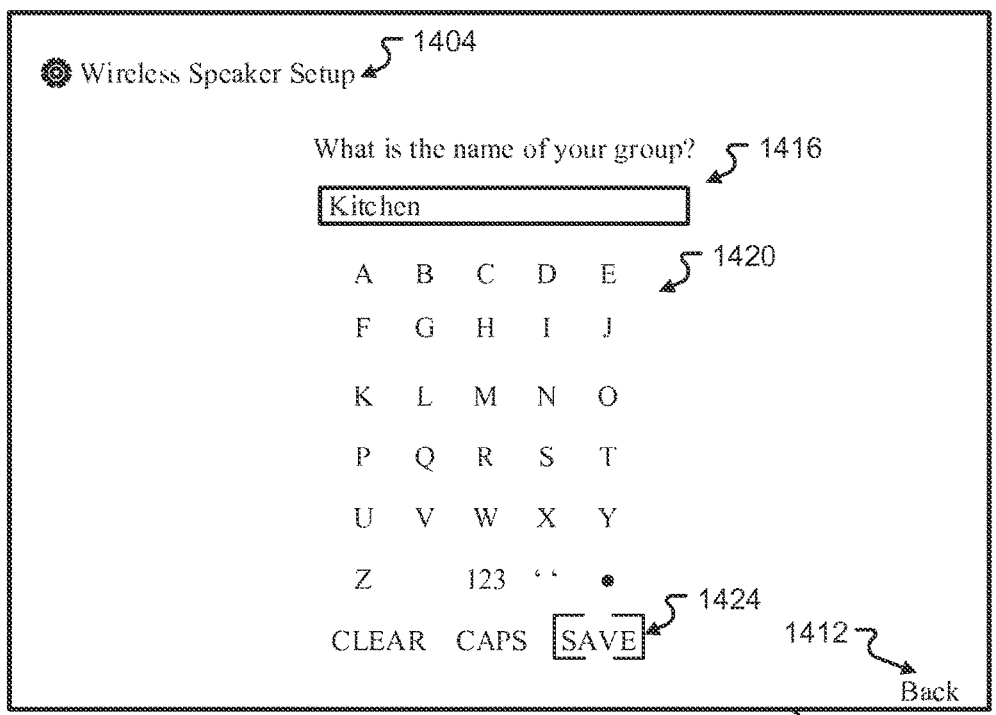
Figure 14C:
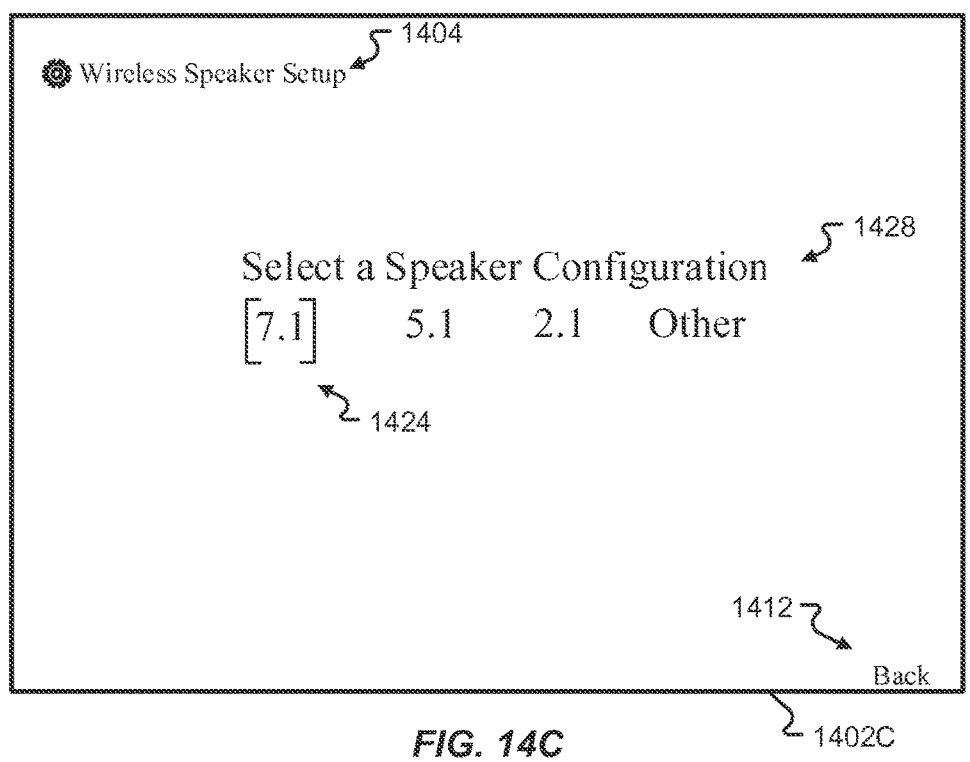
Figure 14D:
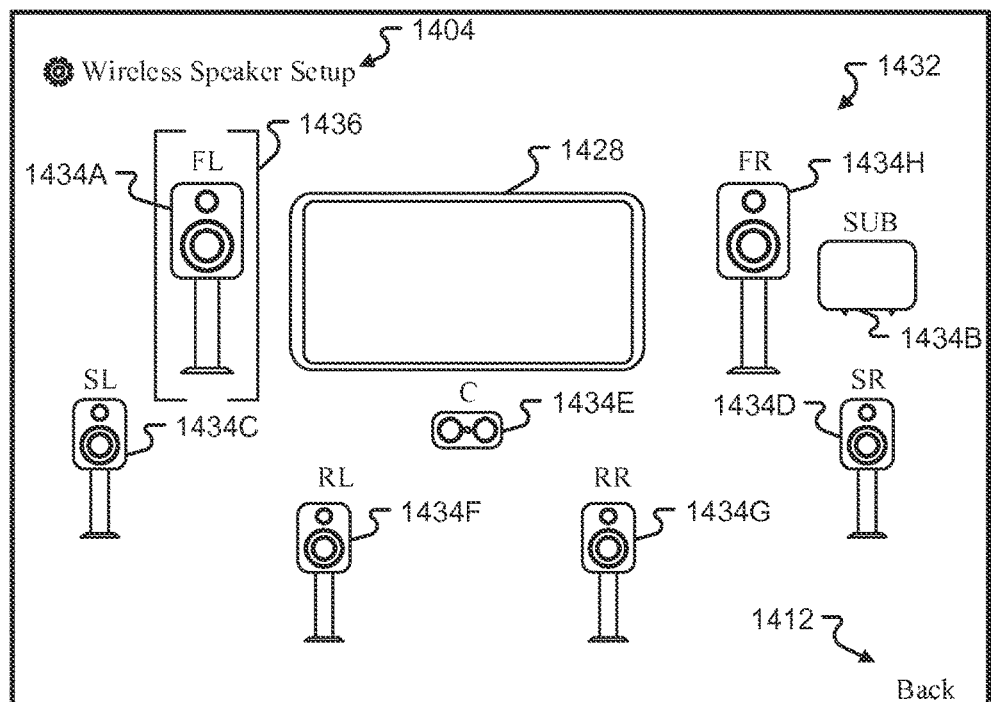

FIG. 14B generally depicts a graphical user interface 1402B that may be displayed in response to a user selecting the "Add New Group" option and/or the "Edit Existing Group" option. The graphical user interface 1402B generally provides a user the ability to create and/or edit configuration parameters associated with a speaker group and/or zone. That is, a user names the new speaker group, which is then used to identify and/or define the new speaker group in the audio/video processing unit 112. For example, the graphical user interface 1402B may allow a user to create a group name and/or edit an existing group name. A user may navigate an onscreen keyboard 1420 by moving the focus 1424 utilizing the remote control 124 and/or a mobile device 120. Once the user has entered one or more text characters into the name text field 1416 selected from the onscreen keyboard 1420, the user may move the focus 1424 to the "Save" option to save the name. By selecting the "Save" option, the wireless speaker setup process may move to the next graphical user interface 1402C illustrated in FIG. 14C. Alternatively, or in addition, the group name may be selected from a predefined list of group names.

The graphical user interface 1402C may generally present a user with one or more speaker group configuration options. For example, the graphical user interface 1402C may prompt a user to select a speaker group configuration with a prompt 1428. The user may then, using the remote control 124 and/or mobile device 120 for example, move the focus 1424 to a desired speaker group configuration. As previously discussed, the audio/video processing unit 112 may automatically select a predetermined speaker configuration based on a number and/or type of available speakers and/or automatically display a number of speaker group configuration options based on a number and/or type of available speakers. For example, if eight speakers are discovered and/or provided in an available speaker list, the audio/video processing unit 112 may select a 7.1 speaker configuration or otherwise present the graphical user interface 1402C with a default or predetermined selected speaker group configuration option, such as a 7.1 speaker group configuration. Alternatively, or in addition, if eight speakers are discovered and/or provided in an available speaker list, the audio/video processing unit 112 may automatically provide a 7.1 speaker configuration, a 5.1 speaker configuration, and/or a 2.1 speaker configuration for selection by a user. As another example, the speaker configurations may base a speaker configuration on the number and type of speakers provided in an available speaker list. For example, if two speakers are previously identified as front speakers (left/right), two speakers are identified as side speakers (left/right), two speakers are identified as rear speakers (left/right), one speaker is identified as a center speaker, and one speaker is identified as a subwoofer, the audio/video processing unit 112 may automatically select and/or present a 7.1 speaker configuration as a default selection. Similarly, the audio/video processor 112 may cause all speaker configurations that are capable of being utilized, given the number and type of speakers, to be presented. Once a user confirms the speaker group configuration, for example by selecting an enter button on the remote control 124, the wireless speaker setup process may move to the next graphical user interface 1402D illustrated in FIG. 14D.

Figure 14E:
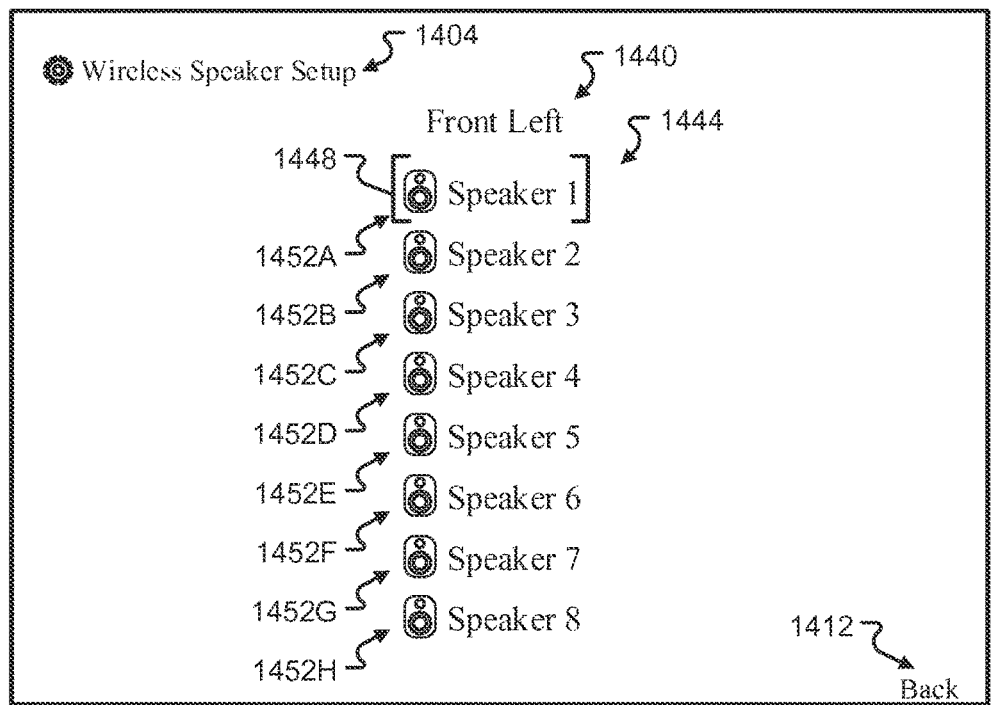
Figure 14F:
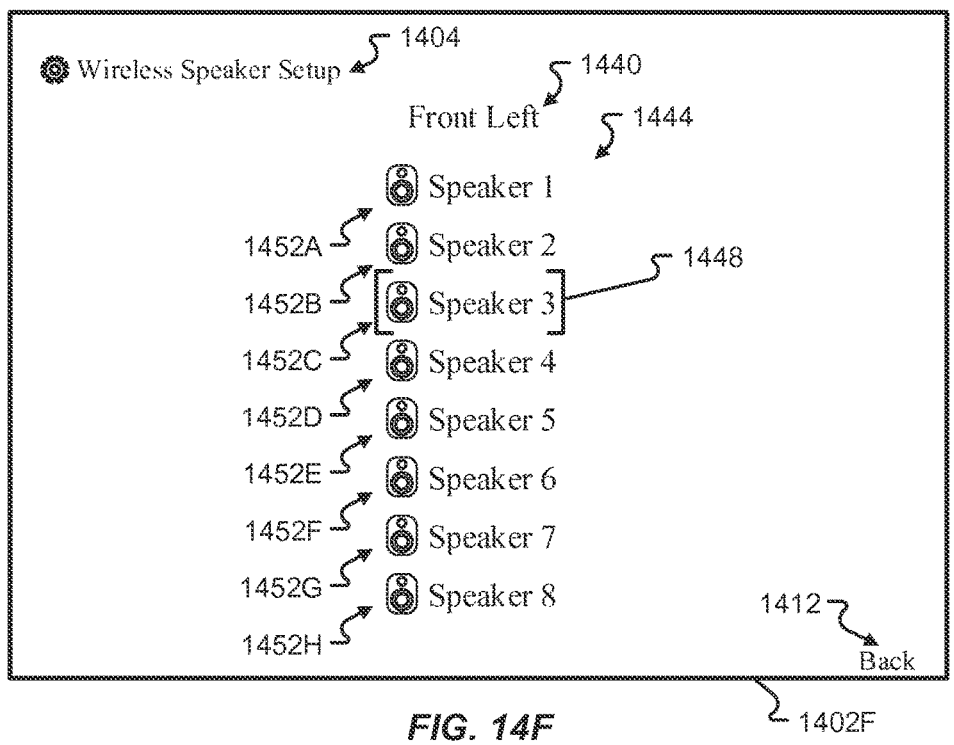
Figure 14G:
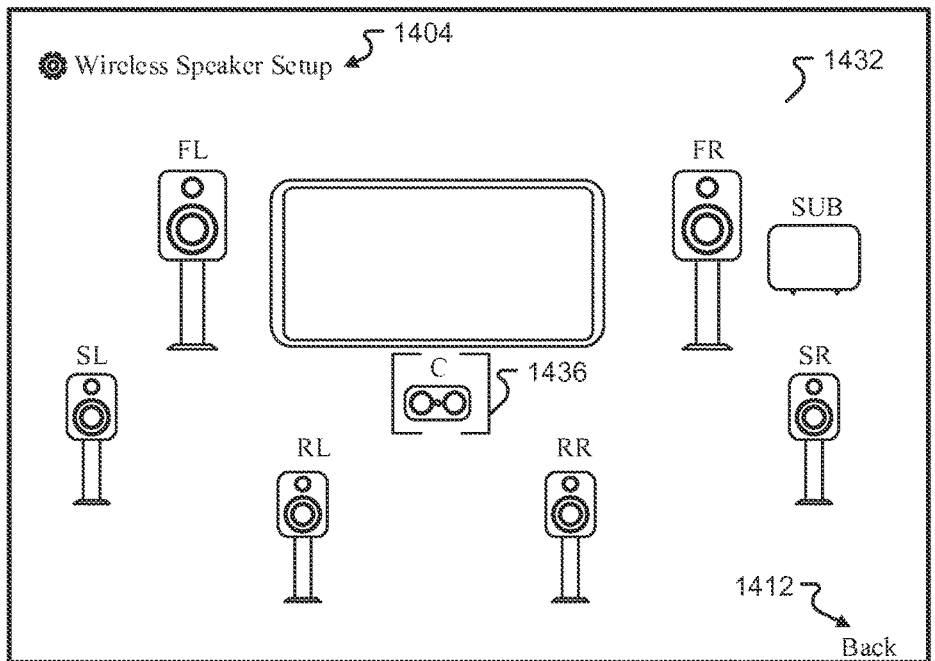
Figure 14H:
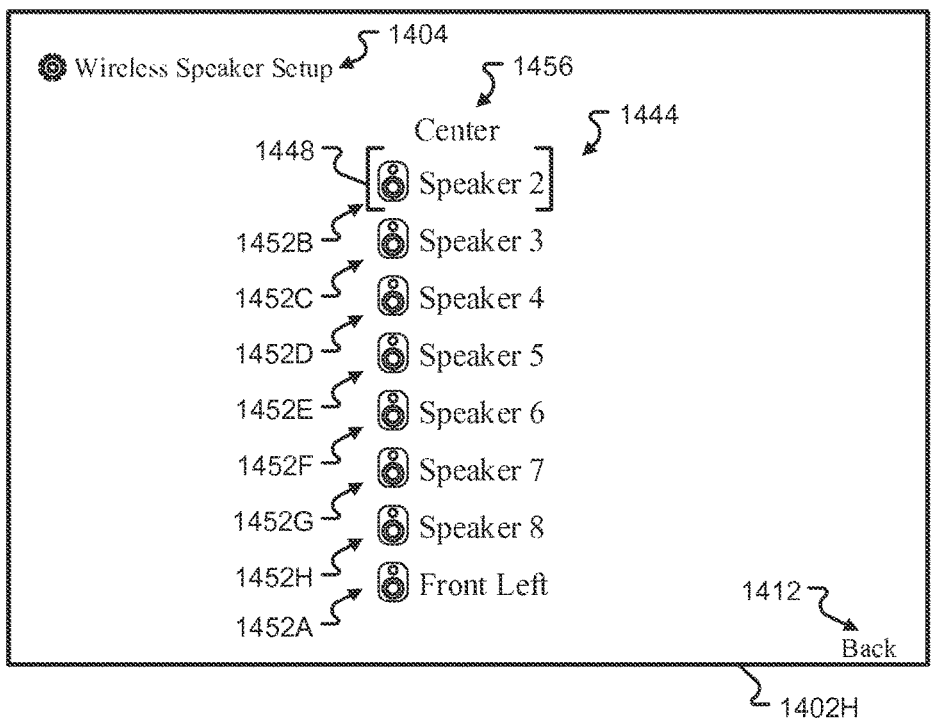
Figure 14I:
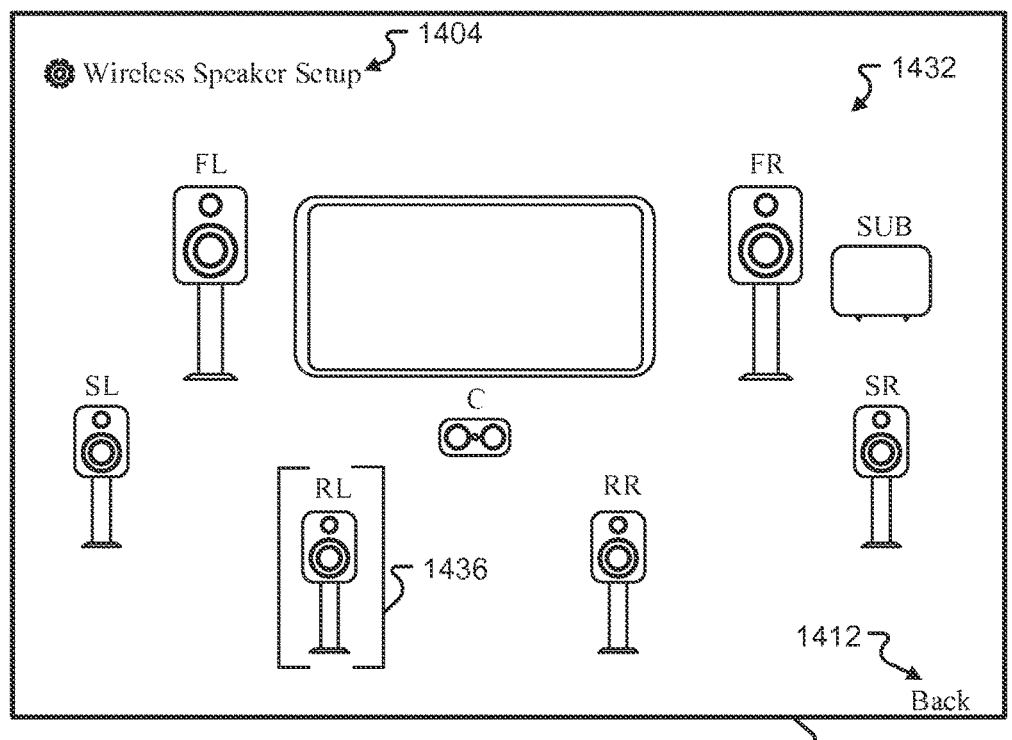

The graphical user interface 1402D may generally present a user with a speaker diagram 1432 consistent with the selected speaker group configuration selected in the graphical user interface 1402C. That is, the speaker diagram 1432 may present one or more graphically selectable options 1434A-H representing speakers associated with speaker locations consistent with a selected speaker group configuration. The one or more graphically selectable options 1434A-H may include, but is not limited to selectable text and/or one or more selectable images. Additionally presented is a representation of a television 1428. The user may navigate through the one or more graphically selectable options 1434A-H, moving the focus 1436 with one or more navigating arrows 125 on the remote control 124 for example, until the focus is at a desired representative speaker location. The user may then confirm the selection, for example by selecting an enter button on the remote control 124, and the wireless speaker setup process may move to the next graphical user interface 1402E where the speaker may then assign one or more speakers to the selected location, as illustrated in FIG. 14E.

The graphical user interface 1402E may generally present a user with a speaker list 1444 that includes a list of one or more previously discovered speakers 1452A-H that may be available to be assigned to the previously selected speaker location. For example, if in the fourth graphical user interface 1404D, a user selected a front speaker location 1434A, the one or more speakers presented in the speaker list 1444 may include all available speakers capable of being assigned to a front speaker location 1434A in a previously selected speaker group configuration. Alternatively, or in addition, if in the graphical user interface 1404D, a user selected a front speaker location 1434A, the one or more speakers presented in the speaker list 1444 may include all speakers paired or otherwise available to the audio/video processing unit 112. Although depicted as listing speakers 1452A-H, it is understood that the speaker list 1444 may include more or less speakers. A user may then move the focus 1448 in order to place the focus on a desired speaker 1452A-H.

When the user moves the focus 1448 to a particular speaker 1452A-H, the audio/video processing unit 112 may cause the physical speaker (one of 204A-B, 208A-B, 212A-B, 216, or 220, for example) identified in the speaker list 1444 to provide one or more indications that the user has selected the physical speaker or otherwise identify the selected physical speaker. For example, each of the speakers 1452A-H may include a default name, "Speaker," followed by a number. Such a default name may be consistent with a first implementation of a speaker setup process where the available speakers contain discovered speakers and/or speakers paired to the audio/video processing unit 112. Accordingly, the default name by itself does not provide a user any information as to where the speaker is physically located. Thus, the indication provided by the physical speaker itself, when selected in the list 1444, may provide information that aids a user in the speaker setup process. As another example, if the user were to move the focus to Speaker 2 1452B, the audio/video processing unit 112 may cause a front right speaker 204B to output a tone or cause a light or LED, such as the indicator 348, on the speaker 204B to blink. As another example, if the user were to move the focus to Speaker 5 1452E, the audio/video processing unit 112 may cause a rear right speaker 212B to output a tone or cause a light on the speaker 212B to blink. As yet another example, if the user were to move the focus to Speaker 1 1452A, the audio/video processing unit 112 may cause a front left speaker 204A to output a tone or cause a light on the speaker 204A to blink. When the tone is played through a speaker, a light or LED is also displayed on the speaker at the desired location, or some other indication is provided at the speaker in the desired location. The user may confirm the selection using, for example, the remote control 124 and/or mobile device 120, to assign the selected speaker to the previously chosen location. For example, as depicted in graphical user interface 1402F of FIG. 14F, the focus 1448 has been moved to Speaker 3 1452C.

In some embodiments, the speakers may be pre-named at the factory for bundled sets that have the speaker locations pre-assigned for ease of installation. For example, the default name for Speaker 1, assuming Speaker 1 is a front left speaker, could be "Front Left."

After the speaker location assignment has been completed, the focus then shifts to the next speaker location in the selected speaker configuration. For example, as depicted in the graphical user interface 1402G of FIG. 14G, the focus 1436 has shifted to the center speaker. The focus may automatically shift to the next speaker location in the selected speaker configuration. Alternatively, or in addition, the user may choose the next speaker location in the selected configuration. The user may then confirm the selection, for example by selecting an enter button on the remote control 124, and the wireless speaker setup process may move to the next graphical user interface 1402H, illustrated in FIG. 14H, where the speaker may then assign one or more speakers to the selected location.

As depicted in the graphical user interface 1402H, a speaker list 1444, including the speakers available to the audio/video processing unit 112, is displayed. The graphical user interface 1402H is the same as or similar to the graphical user interface 1402E except that the speaker list 1444 has been updated with the previously made Front Left speaker assignment 1452A. That is, the name of previous Speaker 1 has been changed to that of the location. Alternatively, or in addition, the name of the newly-assigned speaker may be changed at the direction of the user. For example, the user may be able to invoke an onscreen keyboard to change the name of the speakers. In some embodiments, the speakers 1452A-H in the speaker list 1444 may be arranged, or ordered, according to whether or not a speaker has been assigned to a previously selected location. Accordingly, similar to the graphical user interface 1402E, the user may navigate through the speaker list 1444 such that a tone is played through a desired speaker, a light or LED is displayed on the speaker at the desired location, or some other indication is provided at the selected speaker. Accordingly, the user may confirm the selection of the speaker using, for example, the remote control 124 and/or mobile device 120, to assign the selected speaker to the previously chosen location. For example, as depicted in graphical user interface 1402F, the focus 1448 has been moved to Speaker 3 1452C.

After the speaker location assignment has been completed, the focus then shifts to the next speaker location in the selected speaker configuration. For example, as depicted in the graphical user interface 1402I, illustrated in FIG. 14I, the focus 1436 has shifted to the rear left speaker. The focus may automatically shift to the next speaker location in the selected speaker configuration. Alternatively, or in addition, the user may choose the next speaker location in the selected configuration. The user may then confirm the selection, for example by selecting an enter button on the remote control 124, and the wireless speaker setup process may move to the next graphical user interface 1402J where the speaker may then assign one or more speakers to the selected location.

Figure 14J:
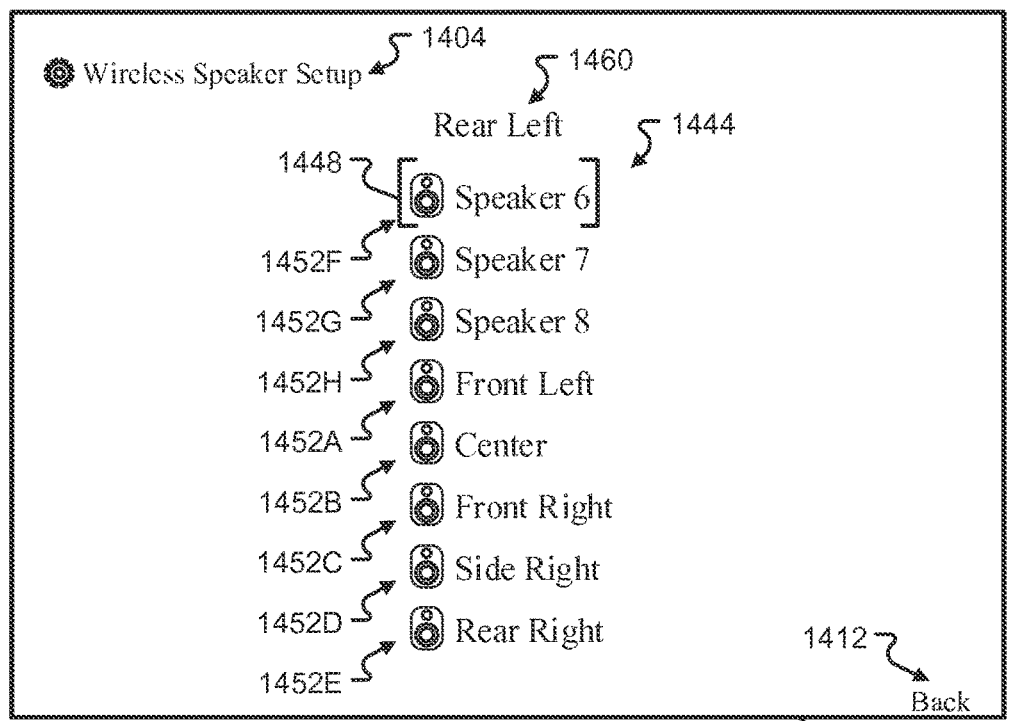

As depicted in the graphical user interface 1402J, illustrated in FIG. 14J, a speaker list 1444, including the speakers available to the audio/video processing unit 112, is displayed. The graphical user interface 1402J is the same as or similar to the graphical user interfaces 1402E and 1404H except that the speaker list 1444 has been updated with the previously made Front Left speaker assignment 1452A, the previously made Center speaker assignment 1452B, a previously made Side Right speaker assignment 1452D, and a previously made Rear Right speaker assignment 1452E. Accordingly, similar to the graphical user interface 1402E and 1402H, the user may navigate through the speaker list 1444 such that a tone is played through a desired speaker, a light or LED is displayed on the speaker at the desired location, or some other indication is provided at the selected speaker. Accordingly, the user may confirm the selection of the speaker using, for example, the remote control 124 and/or mobile device 120, to assign the selected speaker to the previously chosen location.

Figure 14K:
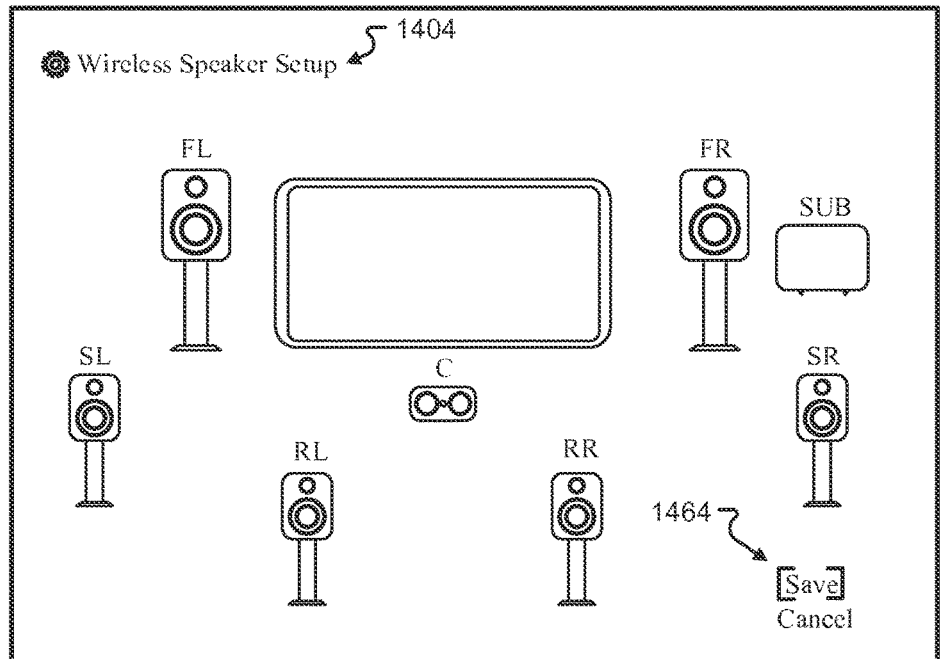
Figure 14L:
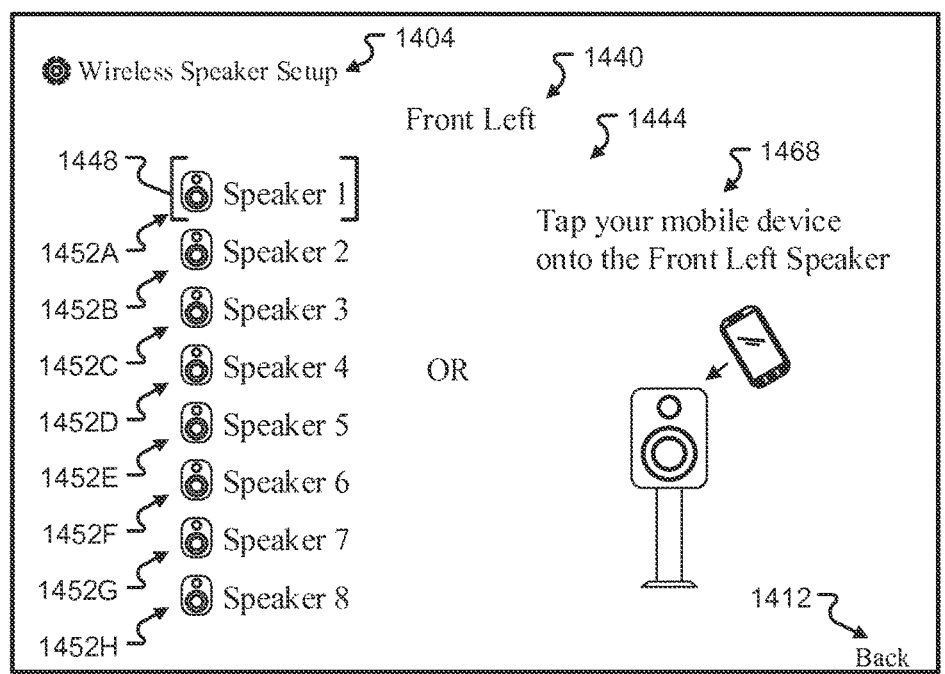

The graphical user interface 1402K, illustrated in FIG. 14K, may then be displayed when one or more speakers have been assigned to one or more speaker locations. That is, once all, or less than all, speaker assignments have been made, a graphical user interface, such as graphical user interface 1402K, may be displayed. The graphical user interface 1402K may include a save option 1464 allowing the user to save the speaker assignments made to the speaker locations made in graphical user interfaces 1402D-J, for example. Once saved, the speaker assignment process has been completed and another graphical user interface may be displayed to the user.

Alternatively, or in addition, the speaker assignment process may utilize other or additional pairing methods. For example, after a user selects a corresponding speaker location, such as has been discussed with respect to FIG. 14D, a process utilizing near frequency communication (NFC) and/or radio frequency identification may be used. For example, the communication interface 320 may support NFC and RFID communication protocols such that a mobile device 120, in communication with speaker 504 and/or audio/video processing unit 112, may utilize NFC and RFID communication in the speaker assignment process. That is, a graphical user interface 1402E of FIG. 14L may prompt a user to tap their NFC-enabled device, such as mobile device 120, on the front left speaker to associate the physical speaker to the front left location (e.g., 1434A). For example, the prompt 1468 may direct a user to tap their mobile device 120 on the speaker of interest; of course, as the selected speaker location changes, the prompt changes as well. Other speaker assignment mechanisms may be utilized. For example, a graphical user interface may prompt a user to press a button on the speaker of interest; of course, as the selected speaker location changes, the prompt would change as well.

Figure 15:
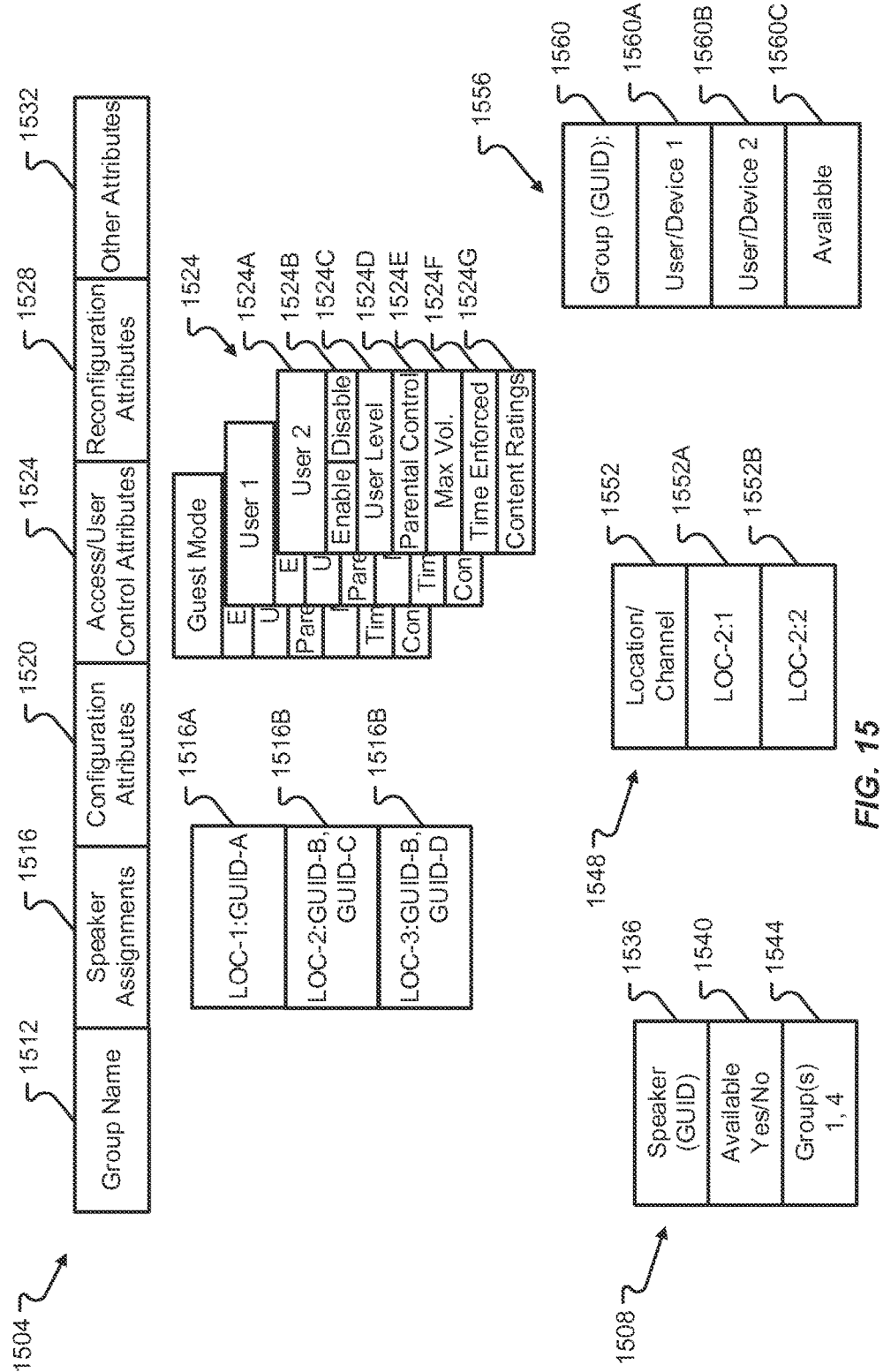
FIG. 15 is a block diagram depicting a first data structure in accordance with at least some embodiments of the present disclosure.

FIG. 15 is a block diagram depicting one or more data structures in accordance with at least some embodiments of the present disclosure. A first data structure 1504 generally relates to information and one or more parameters associated with one or more speaker groups or zones. The first data structure 1504 may be stored within the storage 412 of the audio/video processing unit 112 and/or the speaker 504 and may include a group name field 1512 that includes or is otherwise associated with the name entered in the graphical user interface 1402B and/or received at steps S1208 and/or S1308. The first data structure 1504 may additionally include the speaker assignments made with method 1200 and/or method 1300; such speaker assignments may be stored in the speaker assignment field 1516. For example, the speaker assignment field 1516 may include a globally unique speaker identifier, such as GUID-A, and the associated location, such as LOC-1 as depicted in 1516A. Alternatively, or in addition, the speaker assignment field 1516 may include two or more globally unique speaker identifiers, such as GUID-B and GUID-C (e.g. two speakers), and the associated location LOC-2, as depicted in 1516B. That is, as previously discussed, and in some embodiments more than one speaker may be assigned to a location and/or channel. Alternatively, or in addition, the speaker assignment field 1516 may include two or more globally unique speaker identifiers, such as GUID-B and GUID-C (e.g. two speakers), and the associated location LOC-3, as depicted in 1516C. That is, as previously discussed, and in some embodiments more than one speaker may be assigned to a location and/or channel and a speaker may be assigned to one or more locations.

The first data structure 1504 may also include a group configuration attributes field 1520; the group configuration attributes field may include the selected speaker group configuration, such as 7.1, 5.1, and/or 2.1. Alternatively, or in addition, the group configuration attributes field 1520 may also include one or more speaker group configurations capable of being selected based on a number and/or type of speakers within the group.

The first data structure may also include an access control/user control attributes field 1524. The access control/user control attributes field 1524 may generally include a list of users authorized that are able to use the speaker group identified by the speaker group name 1512. For example, the User 1 and User 2 may be authorized users of a speaker group. The access control/user control attributes field 1524 may also include additional parameters related to each of the users. For example, the access control/user control attributes field 1524 may indicate whether each user is enabled or disabled, that is whether each user, though assigned as an authorize speaker group user, is currently authorized and/or enabled to use the speaker group. Alternatively, or in addition, access control/user control attributes field 1524 may include a user level attribute 1524C. The user level attribute 1524C may be the same as or similar to a privilege level. For example, the user level attribute 1524C may hierarchically categorize users such that a user with a higher or greater level trumps a user with a lower level. Accordingly, if two users are attempting to stream audio content the speaker group, the speaker group will cause the speakers within the group to play or otherwise output the audio content form the user with the higher user level.

The access control/user control attributes field 1524 may also include a parental control field 1524 D which may be enabled and/or disabled on a per user and/or per speaker group basis. For example, the parental control field 1524D may allow other users, or parents, the ability to control certain features associated with the speaker group. For instance, the parental control field 1524D, if enabled, may further control a maximum volume at which the speaker group may be played, include or otherwise identify the hours of the day in which the parental control features are active, and may additionally place restrictions on the type of audio content that may be played through the speakers associated with the speaker group. As another example, the parental control options may work in conjunction with a content rating system and may be set such that audio content from a user, or users, is not played or otherwise output from the speakers assigned to a speaker group if the rating of the audio content exceeds a predetermined threshold, such as an "explicit" rating. However, a user may be able to play explicit content using another speaker group or zone. For example, a first speaker group may not allow the playing of explicit content in a first location, but a second speaker group may allow explicit content.

The access control/user control attributes field 1524 may also allow for or otherwise provide for a "guest mode" of operation. For example, a guest mode provides the ability for a user to "take over" the speakers in a group from another user to play different content. For instance, if you are listening to music with the content streaming from a mobile device 120, and someone else wants to change the song to a song or other audio content originating from their phone, the audio/video processing unit 112 and/or the speaker 504 may allow the guest user to take over the group based on user control settings in the access control/user control attributes field 1524. As another example, the "guest mode" would allow a friend who comes over to a user's home to take over a speaker group to play content, without having to be on the home network. For example, WiFi direct may allow this functionality.

The first data structure 1504 may additionally include a reconfigurable attributes field 1528. The reconfigurable attributes field 1528 may include information that controls whether or not the speaker group, and/or the speakers within the group, may be reconfigured. For example, in instances where a first speaker group includes 8 speakers, the reconfigurable attributes field 1528 may specify whether or not any or all of the speakers may be included in another group. As previously discussed with respect to FIG. 11, a speaker group may share speakers; in some instances, it may not be ideal for speakers to be shared. Alternatively, or in addition, the reconfigurable attributes field may include a privilege level associated with a hierarchically importance of the speaker group. For example, in instances where a speaker group may share speakers with another speaker group, the speaker group having or otherwise assigned the higher privilege level will be provided access to the shared speakers before a speaker group with a lower privilege level. The first data structure 1504 may also include an other attributes field which may include other configurable and non-configurable attributes for the speaker group.

A second data structure 1508 may also be included. Such a data structure may be stored at each of the speakers, at the speaker 504, and/or at the audio/video processor 112. The data structure 1508 generally includes a speaker GUID field 1536 identifying the speaker, an availability field 1540 indicating whether or not the speaker is assignable to a group and/or whether a group is assignable to the speaker, and a group field 1544, indicating which groups the speaker currently belongs to. The data structure 1508 may be consulted when determining whether or not a speaker is available in methods 1200 and 1300.

A third data structure 1548 may also be included. The third data structure 1548 generally provides a mapping from a speaker configuration to one or more audio channels. For instance, a first location, such as front left, may be mapped to an audio channel 1 and a second location, such as center may be mapped to channel 0.

A fourth data structure 1556 may also be included. The fourth data structure 1556 generally provides a mapping of a speaker group 1560 (e.g. by a speaker group GUID) to the users/devices 1560A-B currently assigned to and/or streaming content to the speaker group. In addition, the fourth data structure 1556 associated with a speaker group may include a field 1560C indication whether or not the speaker is group is available for use.

Figure 16:
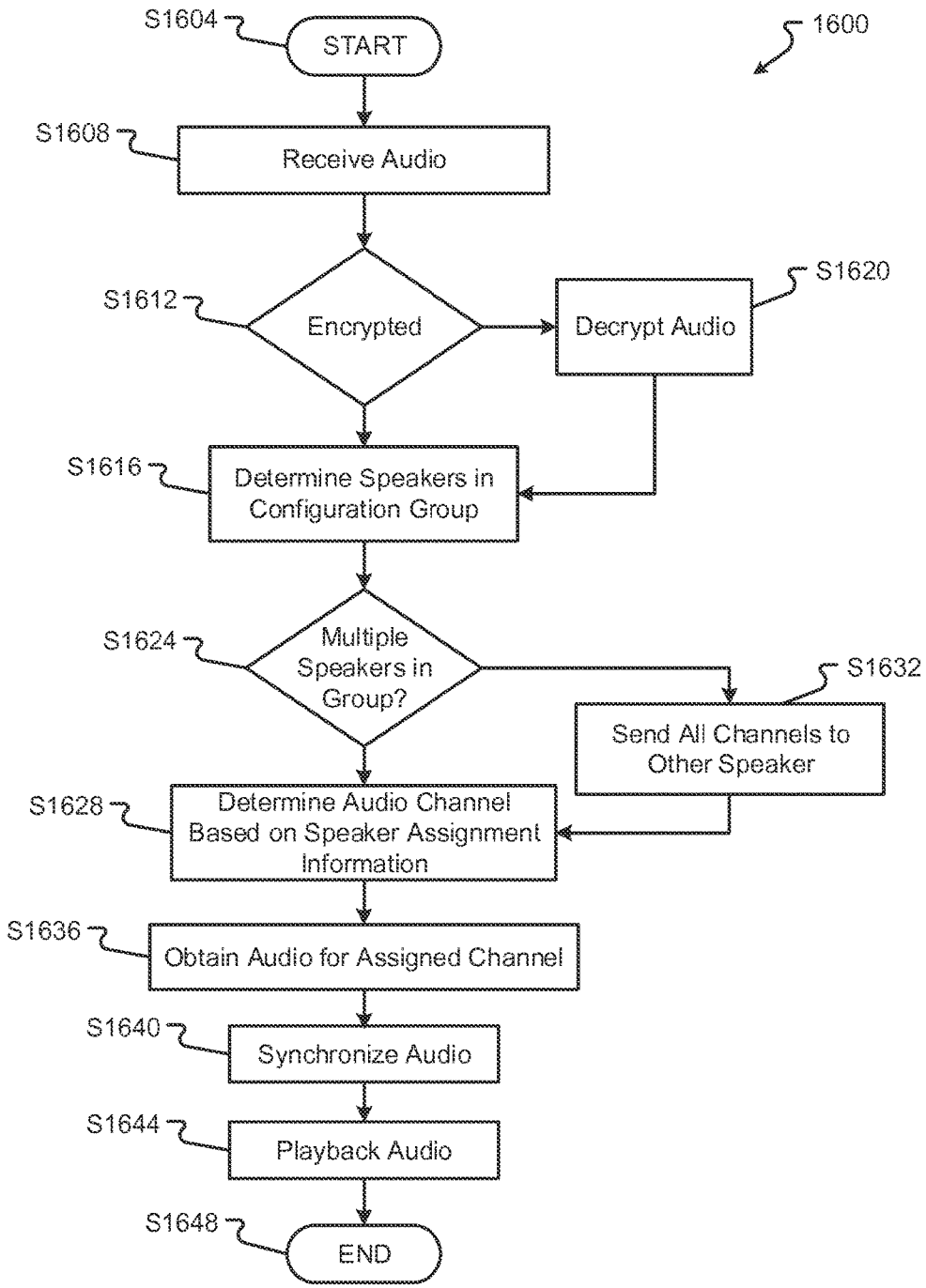
FIG. 16 is a flow diagram depicting details of a first audio dissemination process in accordance with at least some embodiments of the present disclosure.

Referring now to FIG. 16, a method 1600 illustrating an example audio dissemination process in accordance with embodiments of the present disclosure is provided. Method 1600 is in embodiments, performed by one or more devices, such as a speaker 504, an audio/video processing unit 112, and/or a mobile device 120. More specifically, one or more hardware and software components may be involved in performing method 1600. In one embodiment, one or more of the previously described units, or devices, perform one or more of the steps of method 1600. The method 1600 may be executed as a set of computer-executable instructions executed by at least one of the speaker 504, the audio/video processing unit 112, and/or the mobile device 120 and encoded or stored on a computer-readable medium. Hereinafter, the method 1600 shall be explained with reference to systems, components, units, software, etc. described with respect to FIGS. 1-15.

Method 1600 may continuously flow in a loop, flow according to a timed event, or flow according to a change in an operating or status parameter. Method 1600 may be initiated at step S1604 where a multichannel audio stream is provided from one or more sources of multichannel audio. At step S1608, the multichannel audio stream may be received and if it is determined, at step S1612, that the multichannel audio stream is encrypted, the multichannel audio stream may be decrypted at step S1620. Once the multichannel audio stream has been decrypted, or if the multichannel audio stream is not encrypted, the method 1600 proceeds to step S1616 where the speakers in the speaker group are identified and/or located. If, at step S1624, it is determined that there is more than one speaker in the speaker group, all channels of the multichannel audio stream, a single channel of the multichannel audio stream, and/or a single channel of the multichannel audio stream assigned to a specific speaker, may be sent to the specific or respective speakers in the configuration group at step S1632. Each channel may be time synchronized with the other channels before or after it is sent to the specific or respective speakers in the speaker group at step S1632. Accordingly, at step S1628, an audio channel assigned to the local or specific speaker may be determined based on speaker assignment information obtained either from the speaker 504, the audio/video processing unit 112, the mobile device 120, and/or from speaker configuration information located on the speaker itself. For example, the data structures 1504, 1508, and 1512 may be consulted to determine which speakers are assigned to which group and which speakers in the group correspond to which audio channel. Accordingly, at step S1636, the audio for the assigned channel may be separated from the multichannel audio stream. Thereafter, the single channel of audio that was separated from the multichannel audio may be subjected to a time-synchronization process at step S1640 and the audio may then be played at step S1644. Method 1600 may then end at step S1648.

Figure 17:
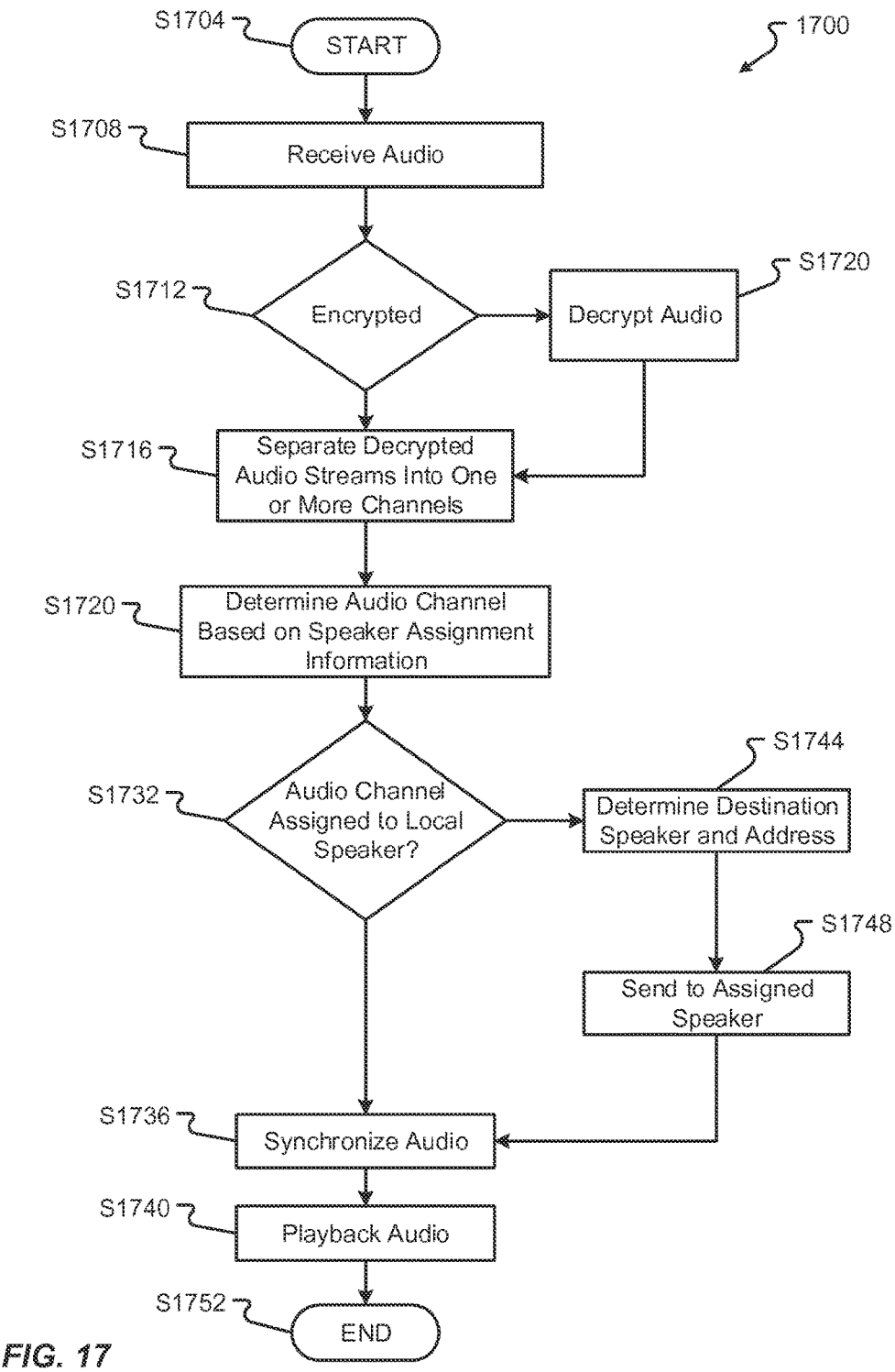
FIG. 17 is a flow diagram depicting details of a second audio dissemination process in accordance with at least some embodiments of the present disclosure.

Referring now to FIG. 17, a method 1700 illustrating an example audio dissemination process in accordance with embodiments of the present disclosure is provided. Method 1700 is in embodiments, performed by one or more devices, such as a speaker 504, an audio/video processing unit 112, and/or a mobile device 120. More specifically, one or more hardware and software components may be involved in performing method 1700. In one embodiment, one or more of the previously described units perform one or more of the steps of method 1700. The method 1700 may be executed as a set of computer-executable instructions executed by at least one of the speaker 504, the audio/video processing unit 112, and/or the mobile device 120 and encoded or stored on a computer-readable medium. Hereinafter, the method 1700 shall be explained with reference to systems, components, units, software, etc. described with respect to FIGS. 1-16.

Method 1700 may continuously flow in a loop, flow according to a timed event, or flow according to a change in an operating or status parameter. Method 1700 may be initiated at step S1704 where a multichannel audio stream is provided from one or more sources of multichannel audio. At step S1708, the multichannel audio stream may be received and if it is determined, at step S1712, that the multichannel audio stream is encrypted, the multichannel audio stream may be decrypted at step S1720. Once the multichannel audio stream has been decrypted, or if the multichannel audio stream is not encrypted, the method 1700 proceeds to step S1716 where the multichannel audio stream is separated into one or more channels of audio data. Based on group configuration information, speaker assignment information, and channel assignment information, for each channel of audio, the speaker assigned to that channel is identified at step S1720. For example, the data structures 1504, 1508, and 1512 may be consulted to determine which speakers are assigned to which group and which speakers in the group correspond to which audio channel. Thereafter, the method S1700 may determine whether a specific audio channel is assigned to the local speaker, such as speaker 504. If so, the method S1700 may proceed to step S1736 where a time-synchronization process is performed. Alternatively, or in addition, for each channel of audio, the destination speaker and destination address may be determined In accordance with embodiments of the present disclosure, each channel is then sent to the assigned speaker. Each speaker then performs a time synchronization process to synchronize the audio throughout the configuration group. At step S1740, the audio is played at each speaker within the group and the method 1700 then ends at step S1752.

Figure 18:
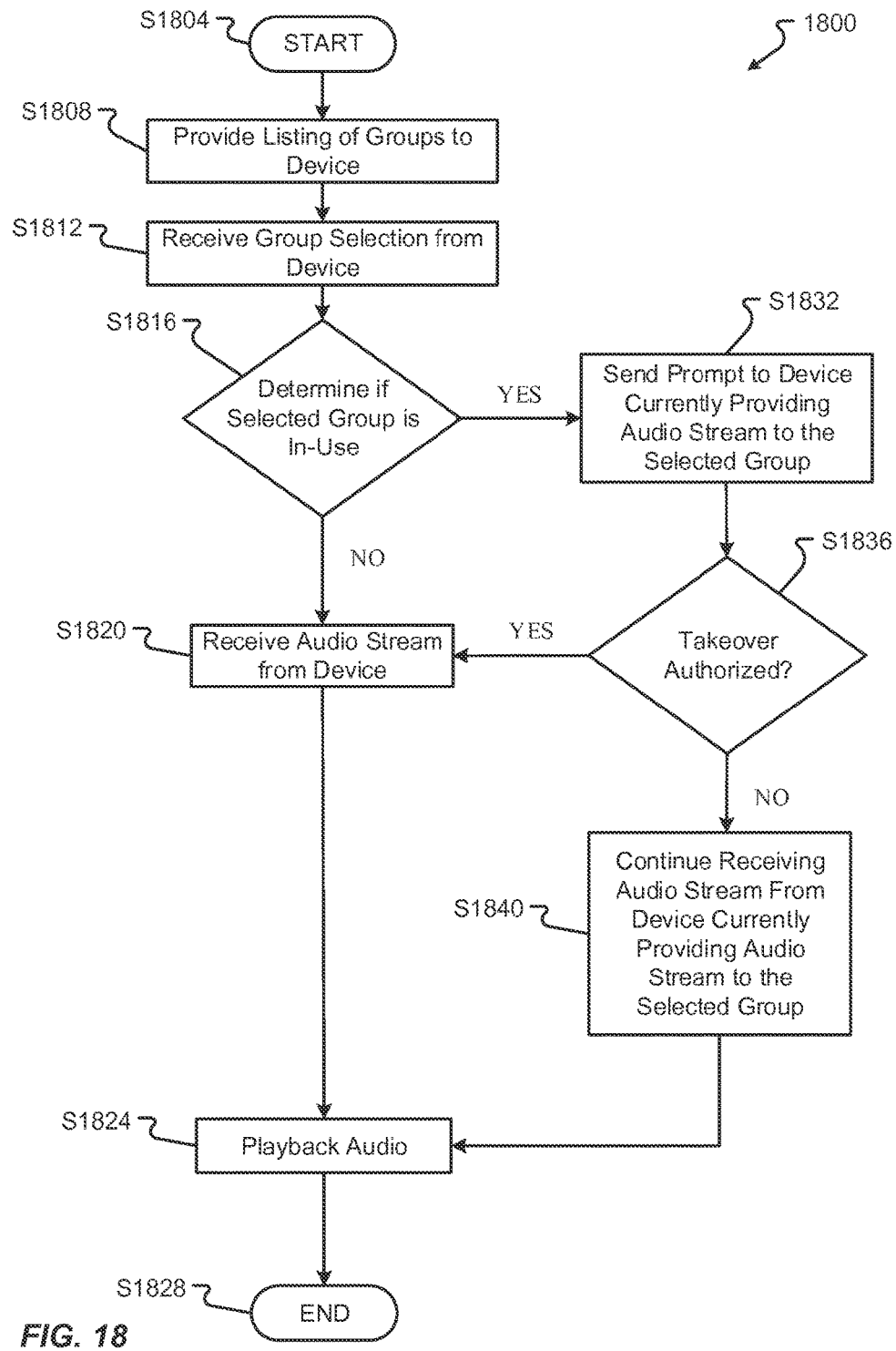
FIG. 18 is a flow diagram depicting details of a speaker group selection and audio playback process in accordance with at least some embodiments of the present disclosure.

Referring now to FIG. 18, a method 1800 is displayed illustrating details of a speaker group selection and audio playback process in accordance with at least some embodiments of the present disclosure. Method 1800 is in embodiments, performed by one or more devices, such as a speaker 504, an audio/video processing unit 112, and/or a mobile device 120. More specifically, one or more hardware and software components may be involved in performing method 1800. In one embodiment, one or more of the previously described units perform one or more of the steps of method 1800. The method 1800 may be executed as a set of computer-executable instructions executed by at least one of the speaker 504, the audio/video processing unit 112, and/or the mobile device 120 and encoded or stored on a computer-readable medium. Hereinafter, the method 1800 shall be explained with reference to systems, components, units, software, etc. described with respect to FIGS. 1-17.

Method 1800 may continuously flow in a loop, flow according to a timed event, or flow according to a change in an operating or status parameter. Method 1800 may be initiated at step 1804 where a user wishes to play multimedia content, specifically audio content, to one or more speaker groups. More particularly, a device the user is using, such as an audio/video processing unit 112 and/or a mobile device 120, may be used to request a list of available speaker groups. At step S1808, the speaker 504 and/or the audio/video processing unit 112 may present the list of available speaker groups to the user. For example, the speaker 504 and/or the audio/video processing unit 112 may cause the list to be displayed on a television 116 and/or a display of the mobile device 120. Accordingly, at step S1812, a selection of a speaker group from the user may be received. The selection may be received at the speaker 504 and/or the audio/video processing unit 112.

Once the selected group is received, the speaker 504 and/or the audio/video processing unit 112 may determine whether or not the group is currently in-use and/or already assigned to a user. For example, the speaker 504 and/or the audio/video processing unit 112 may determine which user or device, if any, is currently using the speaker group utilizing the data structure 1556. Accordingly, if the speaker group is not in use, the speaker 504 and/or the audio/video processing unit 112 may assign the user and/or device to the group and proceed to receive an audio stream from the device in step S1820. At step S1824, the audio may be played by the selected speaker group and the method ends at step S1828.

Alternatively, or in addition, if the speaker group is in use, the speaker 504 and/or the audio/video processing unit 112 may send a prompt to the user and/or the device currently providing the audio stream to the selected group at step S1832. For example, the speaker 504 and/or the audio/video processing unit 112 may determine which device is currently streaming audio using the data structure 1556, and send a prompt to that device. At step S1836, if a takeover is authorized, according to the access control/user control attributes 1524 and/or in response to receiving an indication from the user/device currently streaming audio, the method 1800 may proceed to steps S1820 where an audio stream is received from the device for playback. Alternatively, or in addition, if the takeover is not authorized, the audio stream already being received from the user/device will continue to be received at steps S1840. Method 1800 may also be implemented using a guest device in a manner consistent with that which has been described.

Figure 19:
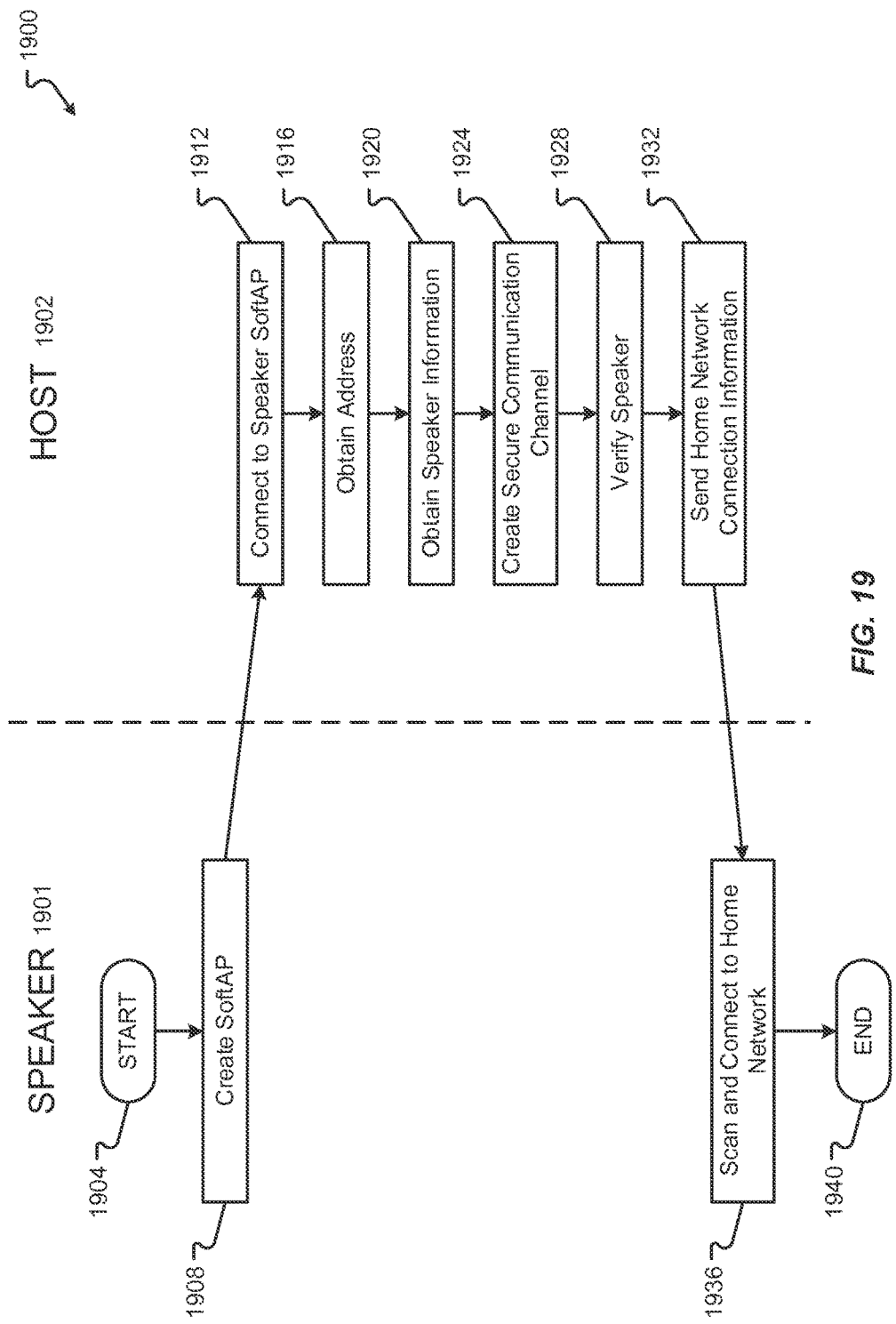
FIG. 19 is a flow diagram depicting details of a method of discovering one or more speakers and configuring such speakers in accordance with embodiments of the present disclosure.

Referring now to FIG. 19, a method 1900 of discovering one or more speakers 1901, such as speakers 108A-108B, and configuring such speakers in accordance with embodiments of the present disclosure is provided. Method 1900 is in embodiments, performed by one or more devices, such as a host device 1902 and a speaker device 1901. More specifically, one or more hardware and software components may be involved in performing method 1900. In one embodiment, one or more of the previously described units, or devices, perform one or more of the steps of method 1900. For example, the host device 1902 may refer to a mobile device 120 as previously described. Alternatively, or in addition, the host device 1902 may refer to the wireless audio video processor 112. The host device 1902 and the speaker 1901 may perform all of or at least some of the steps of method 1900. The method 1900 may be executed as a set of computer-executable instructions executed by at least one of the speaker 1901 and the host 1902 and encoded or stored on a computer-readable medium. Hereinafter, the method 1900 shall be explained with reference to systems, components, units, software, etc. described with FIGS. 1-18.

Method 1900 may continuously flow in a loop, flow according to a timed event, or flow according to a change in an operating or status parameter. Method 1900 may be imitated at step 1904, where an out of the box configuration of the speaker 1901 is initiated. That is, a speaker, such as speaker 1901, will create its own open or secured wireless access point in step 1908. Such access point may be referred to as a SoftAP and have a standardized service set identifier (SSID), or network name, of the form "NAMExxxx" where xxxx is a random character alphanumeric string of a fixed or variable length appended to an alphanumeric string of a known value and NAME is a known alphanumeric string of a fixed or variable length. The speaker 1901 may scan for existing SSIDs which match the random SSID it generated before hosting the SoftAP to confirm it is unique and will generate a new random string if it finds it. The process may repeat until the SSID is unique.

Next, at step 1912, a speaker configuration application running on host 1902 may continuously scan in the background looking for new SSIDs, and if the speaker configuration application finds a new SSID of the form "NAMExxxx", the speaker configuration application may inform the user of the new speakers found and ask if they want to set them up. Accordingly, if the user wants to set up the new speakers, the speaker configuration application will connect to the speaker having the "NAMExxxx" SSID. Alternatively, or in addition, a speaker configuration application running on host 1902 may continuously scan in the background looking for new SSIDs, and if the speaker configuration application finds a new SSID of the form "NAMExxxx", the speaker configuration application may obtain an address by giving itself a Link Local Address or using DHCP to obtain an IP address. At step 1920, the host 1302 may obtain speaker information, such a s a GUID, by utilizing the Simple Service Discover Protocol (SSDP). Although the use of Link Local Address, DHCP, and SSDP has been described, other mechanisms for assigning addresses and/or other broadcast/multicast mechanisms may be utilized and are contemplated.

At step 1924, the host 1902 may create a secure connection to the speaker 1901. Such secure connection may include a cryptographic protocol designed to provide communication security over the network 104; such protocol may include but is not limited to a TLS connection. At step 1928, the host 1902 may utilize a physical mechanism, such as indicator 348, to have a user physically identify the speaker. Such physical mechanism may include a blinking LED, an audio tone, a playback of a number sequence or the like which allows the speaker to be verified. At step 1932, the host may then send network information, such as the home network SSID and the key, or passphrase, to the speaker 1901. Such information may be sent over the secure communication channel. The speaker 1901 may then scan, identify, and connect to the home network at step 1936. Accordingly, the host 1902 may maintain the GUID of the speaker in an availability list, such as a data structure 1508, to provide a list of available speakers during a speaker assignment process. Method 1900 may then end at step 1940.

In some instances, there might not be a home network to connect to. In this event, the host 1902 may create an access point to act as a configuration network and may use Wi-Fi protected setup (WPS) with a button press on the speaker to connect to it. Such a configuration process may be a fallback advanced mode for use cases when there is not a home network (such as outside at a park). Note that this is not necessary to use a preexisting group without the home network, this is only needed in the unlikely case that the group needs to be reconfigured "on the fly" when outside your home network.

In accordance the present disclosure, embodiments of the present disclosure may be configured as follows:

(1) A device comprising: a processor, and memory, wherein the memory contains processor executable instructions that when executed, cause the processor to discover one or more wireless speakers, output to a display device, a speaker diagram illustrating a speaker configuration, wherein the speaker configuration includes a plurality of speaker locations, receive a selection of a speaker location from the plurality of speaker locations, output to the display device, a list of wireless speakers, wherein the list of wireless speakers corresponds to the discovered one or more wireless speakers, receive a selection of a wireless speaker from the list of wireless speakers, and associate the selected wireless speaker to the selected speaker location.

(2) A method, comprising: discovering one or more wireless speakers, displaying, to an output device, a speaker diagram illustrating a speaker configuration, wherein the speaker configuration includes a plurality of speaker locations, receiving a selection of a speaker location from the plurality of speaker locations, displaying, to the output device, a list of wireless speakers, wherein the list of wireless speakers corresponds to the discovered one or more wireless speakers, receiving a selection of a wireless speaker from the list of wireless speakers, and associating the selected wireless speaker to the selected speaker location.

(3) A tangible computer-readable medium storing instructions thereon to discover and assign one or more wireless speakers, wherein the instructions, when executed on a processor, cause the processor to perform the method of (2).

(4) The embodiment of any one of (1) to (3) above, further comprising causing an audio tone to be emitted from the selected wireless speaker.

(5) The embodiment of any one of (1) to (4) above, further comprising turning on and off at least one visual indicator located on the selected wireless speaker.

(6) The embodiment of any one of (1) to (5) above, wherein the speaker configuration is based on a number of discovered wireless speakers.

(7) The embodiment of any one of (1) to (6) above further comprising receiving a selection of a second speaker location from the plurality of speaker locations, displaying, to the output device, the list of wireless speakers, receiving a selection of a second wireless speaker from the list of wireless speakers, and assigning the selected second wireless speaker to the selected second speaker location.

(8) The embodiment of any one of (1) to (7) above further comprising receiving multi-channel audio content from an audio source, transmitting a first channel of the multi-channel audio content to the first wireless speaker, and transmitting the second channel of the multi-channel audio content to the second wireless speaker.

(9) The embodiment of (8) above further comprising associating the first and second wireless speakers to a first speaker group, and associating the second wireless speaker to a second speaker group.

(10) The embodiment of any one of (1) to (9) above, wherein the device is a speaker.

(11) The embodiment of any one of (1) to (10) above, wherein multi-channel audio content is received at a speaker.

(12) The embodiment of (11) above, where the multi-channel audio content is received using a Bluetooth connection.

(13) The embodiment of anyone of (11) to (12) above, wherein the multi-channel audio content is distributed to one or more other speakers via a different wireless medium.

(14) The embodiment of (13) above, wherein the different wireless medium is WiFi.

(15) The embodiment of any one of (1) to (14) above, wherein at least one speaker is a mobile device.

(16) A method of reconfiguring a wireless speaker assigned to a first group of speakers, the method comprising receiving a request to use a second group of speakers, wherein the wireless speaker is common to the first group of speakers and the second group of speakers, determining if the wireless speaker is available, and based on the determining, assigning the wireless speaker to the second group of speakers.

(17) A multichannel audio system comprising a first plurality of speakers, a second plurality of speakers, wherein at least one speaker of the first plurality of speakers is common to the second plurality of speakers, and a speaker assignment module, wherein the speaker assignment module is operable to: determine if the speaker in common with the first and second plurality of speakers is available, and assign the speaker in common with the first and second plurality of speakers to the second plurality of speakers, wherein a first channel of a multichannel audio stream is assigned to the speaker in common with the first and second plurality of speakers.

(18) A method comprising discovering one or more wireless speakers, outputting to a display device, a prompt identifying at least one speaker location, output to the display device, a list of wireless speakers, wherein the list of wireless speakers corresponds to the discovered one or more wireless speakers, receiving a selection of a wireless speaker from the list of wireless speakers, and associating the selected wireless speaker to the at least one speaker location.

(19) A method comprising discovering one or more wireless speakers, outputting to a display device, a prompt identifying at least one speaker location, receiving a selection of a wireless speaker, and associating the selected wireless speaker to the at least one speaker location, wherein the selection of the wireless speaker is (i) received from a mobile device using a near filed communication protocol, or (ii) identified based on receiving an indication directly from the wireless speaker, wherein the indication results from a button on the wireless speaker being pressed.

(20) The method of any one of (18) to (19) above, further comprising outputting to a display device a speaker diagram illustrating a speaker configuration, wherein the speaker configuration includes a plurality of speaker locations.

(21) The method of (20) above, further comprising receiving a selection of a speaker location from the plurality of speaker locations, wherein the at least one speaker location is the selected speaker location.

(22) The method of (21) above, further comprising receiving a selection of a second speaker location from the plurality of speaker locations, outputting, to the display device, the list of wireless speakers, receiving a selection of a second wireless speaker from the list of wireless speakers, and assigning the selected second wireless speaker to the selected second speaker location.

(23) The method of (22) above, further comprising receiving multi-channel audio content from an audio source, transmitting a first channel of the multi-channel audio content to the first wireless speaker, and transmitting the second channel of the multi-channel audio content to the second wireless speaker.

(24) The method of (23) above, further comprising associating the first and second wireless speakers to a first speaker group, and associating the second wireless speaker to a second speaker group.

(25) The method of any one of (20) to (24) above, wherein the speaker configuration is based on a number of discovered wireless speakers.

(26) The method of any one of (18) to (25) above, further comprising causing an audio tone to be emitted from the selected wireless speaker.

(27) The method of any one of (18) to (26) above, further comprising turning on and off at least one visual indicator located on the selected wireless speaker.

(28) The method of any one of (18) to (27) above, wherein multi-channel audio content is received at a wireless speaker.

(29) The method of (28) above, where the multi-channel audio content is received using a Bluetooth connection.

(30) The method of any one of (28) to (29) above, wherein the multi-channel audio content is distributed to one or more other speakers via a different wireless medium.

(31) The embodiment of (30) above, wherein the different wireless medium is WiFi.

(32) The embodiment of any one of (18) to (31) above, wherein at least one wireless speaker is a mobile device.

(33) A method discovering one or more wireless speakers, causing at least one of (i) an audio tone to be emitted from at least one wireless speaker of the one or more wireless speakers and/or (ii) at least one visual indicator to turn on and off for at least one wireless speaker of the one or more wireless speakers, outputting to a display device, at least one of (i) a speaker diagram illustrating a speaker configuration and/or (ii) a list of wireless speakers, receiving a selection of a speaker location from the at least one of (i) the speaker diagram and/or (ii) the list of wireless speakers, and associating the selected speaker location to the at least one wireless speaker.

(34) A tangible computer-readable medium storing instructions thereon to discover and assign one or more wireless speakers, wherein the instructions, when executed on a processor, cause the processor to perform the method of any one of (18) to (33) above.

(35) A device comprising one or more processors and memory, wherein the memory contains one or more processor executable instructions that when executed, cause the one or more processors to perform the method according to any one of (18) to (33) above.

(36) The device of (35) above, wherein the device is a speaker.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A device comprising:
one or more processors; and
memory, wherein the memory contains one or more processor executable instructions that when executed, cause the one or more processors to:
create a first speaker group;
discover one or more wireless speakers in communication with the device;
output to a display device, a prompt indicating at least one speaker location;
output to the display device, a list of wireless speakers, wherein the list of wireless speakers corresponds to the discovered one or more wireless speakers;
receive a selection of a wireless speaker from the list of wireless speakers, wherein the selected wireless speaker has been previously assigned to a second speaker group;
assign the selected wireless speaker to the first speaker group such that the selected wireless speaker is assigned to the first speaker group and the second speaker group at a same time, wherein the first speaker group includes a plurality of wireless speakers, and wherein the second speaker group includes a plurality of wireless speakers at least one of which is not included in the first speaker group;
associate the selected wireless speaker to the at least one speaker location;
receive audio content from an audio source; and
transmit the received audio content to the plurality of wireless speakers of the first speaker group over a wireless communication network.

2. The device of claim 1, wherein the one or more processor executable instructions cause the one or more processors to output to the display device a speaker diagram illustrating a speaker configuration, wherein the speaker configuration includes a plurality of speaker locations.

3. The device of claim 2, wherein the one or more processor executable instructions cause the one or more processors to receive a selection of a speaker location from the plurality of speaker locations, wherein the at least one speaker location is the selected speaker location.

4. The device of claim 3, wherein the one or more processor executable instructions cause the one or more processors to:
receive a selection of a second speaker location from the plurality of speaker locations;
output, to the display device, the list of wireless speakers;
receive a selection of a second wireless speaker from the list of wireless speakers; and
associate the selected second wireless speaker to the selected second speaker location.

5. The device of claim 4, wherein the one or more processor executable instructions cause the one or more processors to:
receive multi-channel audio content from an audio source;
transmit a first channel of the multi-channel audio content to a first wireless speaker of the one or more wireless speakers; and
transmit a second channel of the multi-channel audio content to a second wireless speaker of the one or more wireless speakers.

6. The device of claim 2, wherein the speaker configuration is based on a number of discovered wireless speakers.

7. The device of claim 1, wherein the one or more processor executable instructions cause the one or more processors to cause an audio tone to be emitted from the selected wireless speaker.

8. The device of claim 1, wherein the one or more processor executable instructions cause the one or more processors to turn on and off at least one visual indicator located on the selected wireless speaker.

9. The device of claim 1, wherein the at least one speaker location assigned to the selected wireless speaker in the first speaker group is different from a speaker location assigned to the selected wireless speaker in the second speaker group.

10. A method comprising:
discovering one or more wireless speakers in communication with an audio processing device;
outputting to a display device, a prompt identifying at least one speaker location;
outputting to the display device, a list of wireless speakers, wherein the list of wireless speakers corresponds to the discovered one or more wireless speakers;
receiving a selection of a wireless speaker from the list of wireless speakers, wherein the selected wireless speaker is assigned to a first speaker group;
associating the selected wireless speaker to the at least one speaker location;

assigning the selected wireless speaker to a second speaker group such that the selected wireless speaker is simultaneously assigned to the first and second speaker group, wherein the first speaker group includes a plurality of wireless speakers, and wherein the second speaker group includes a plurality of wireless speakers at least one of which is not included in the first speaker group;

receiving, by the audio processing device, audio content from an audio source; and transmitting, by the audio processing device, the received audio content to the plurality of wireless speakers of the first speaker group over a wireless communication network.

11. The method of claim 10, further comprising outputting to the display device a speaker diagram illustrating a speaker configuration, wherein the speaker configuration includes a plurality of speaker locations.

12. The method of claim 11, further comprising receiving a selection of a speaker location from the plurality of speaker locations, wherein the at least one speaker location is the selected speaker location.

13. The method of claim 12, further comprising:
receiving a selection of a second speaker location from the plurality of speaker locations;
outputting, to the display device, the list of wireless speakers;
receiving a selection of a second wireless speaker from the list of wireless speakers; and
associating the selected second wireless speaker to the selected second speaker location.

14. The method of claim 13, further comprising:
receiving multi-channel audio content from an audio source;
transmitting a first channel of the multi-channel audio content to a first wireless speaker of the one or more wireless speakers; and
transmitting a second channel of the multi-channel audio content to a second wireless speaker of the one or more wireless speakers.

15. The method of claim 11, wherein the speaker configuration is based on a number of discovered wireless speakers.

16. The method of claim 10, further comprising causing an audio tone to be emitted from the selected wireless speaker.

17. The method of claim 10, further comprising turning on and off at least one visual indicator located on the selected wireless speaker.

18. The method of claim 10, wherein the at least one speaker location assigned to the selected wireless speaker in the first speaker group is different from a speaker location assigned to the selected wireless speaker in the second speaker group.

19. A computer program product comprising one or more computer-readable storage devices having stored thereon computer-executable instructions that are executable by one or more processors of a computer system to perform the method of claim 10.

20. A method comprising:
creating a first speaker group;
discovering one or more wireless speakers in communication with an audio processing device;
causing at least one of (i) an audio tone to be emitted from at least one wireless speaker of the one or more wireless speakers and/or (ii) at least one visual indicator to turn on and off for at least one wireless speaker of the one or more wireless speakers;
outputting to a display device, at least one of (i) a speaker diagram illustrating a speaker configuration and/or (ii) a list of wireless speakers;
receiving a selection of a speaker location from the at least one of (i) the speaker diagram and/or (ii) the list of wireless speakers;
associating the selected speaker location to the at least one wireless speaker;
assigning the at least one wireless speaker to the first speaker group such that the at least one wireless speaker is assigned to the first speaker group and a second speaker group at a same time, wherein the first speaker group includes a plurality of wireless speakers, and wherein the second speaker group includes a plurality of wireless speakers at least one of which is not included in the first speaker group;
receiving, by the audio processing device, audio content from an audio source; and
transmitting, by the audio processing device, the received audio content to the plurality of wireless speakers of the first speaker group over a wireless communication network.

* * * * *